United States Patent
Surprenant et al.

(10) Patent No.: US 9,599,231 B2
(45) Date of Patent: Mar. 21, 2017

(54) DOUBLE FLAP VALVE WITH QUICK-CHANGE REPLACEABLE WEAR SURFACE

(75) Inventors: Dean Surprenant, Plattsburgh, NY (US); Kevin Guay, Plattsburgh, NY (US)

(73) Assignee: PLATTCO CORPORATION, Plattsburgh, NY (US)

( * ) Notice: Subject to any disclaimer, the term of this patent is extended or adjusted under 35 U.S.C. 154(b) by 493 days.

(21) Appl. No.: 14/114,050

(22) PCT Filed: Apr. 26, 2012

(86) PCT No.: PCT/US2012/035171
§ 371 (c)(1),
(2), (4) Date: Oct. 25, 2013

(87) PCT Pub. No.: WO2012/149132
PCT Pub. Date: Nov. 1, 2012

(65) Prior Publication Data
US 2014/0048733 A1    Feb. 20, 2014

Related U.S. Application Data

(60) Provisional application No. 61/479,147, filed on Apr. 26, 2011.

(51) Int. Cl.
F16K 3/00 (2006.01)
F16K 1/20 (2006.01)
F16K 3/04 (2006.01)

(52) U.S. Cl.
CPC .......... *F16K 1/2057* (2013.01); *F16K 1/2007* (2013.01); *F16K 3/04* (2013.01); *Y10T 137/0514* (2015.04)

(58) Field of Classification Search
CPC ........ F16K 1/2057; F16K 1/2007; F16K 3/04; Y10T 137/0514
USPC ........... 137/15.18, 15.23; 251/298, 299, 300, 251/359, 360, 363
See application file for complete search history.

(56) References Cited

U.S. PATENT DOCUMENTS

| 2,833,511 A | 5/1958 | Bertram |
| 3,257,045 A | 6/1966 | Urgel |
| 4,033,549 A * | 7/1977 | Stamer .................. F16K 1/2028 251/298 |
| 4,304,254 A | 12/1981 | O'Connell et al. |

(Continued)

FOREIGN PATENT DOCUMENTS

WO    8202237    7/1982

OTHER PUBLICATIONS

Meyer Double-Flapgate Airlock Valves, http://www.sawyerhanson.com/uploads/docs/meyer/Meyer_DoubleFlapGateValves.pdf, Downloaded on Aug. 24, 2010.

(Continued)

*Primary Examiner* — Craig Schneider
*Assistant Examiner* — Andrew J Rost
(74) *Attorney, Agent, or Firm* — Gerry J. Elman; Elman Technology Law, P.C.

(57) ABSTRACT

A flap-gate valve having a replaceable wear surface, methods of replacing a wear surface with a replacement wear surface, and methods of retrofitting an existing flap-gate valve with components adapted to work in conjunction with a replaceable wear surface.

19 Claims, 18 Drawing Sheets

(56) References Cited

U.S. PATENT DOCUMENTS

| | | | |
|---|---|---|---|
| 4,307,747 A | | 12/1981 | Carpentier |
| 4,331,316 A | | 5/1982 | Jandrasi |
| 4,469,122 A | * | 9/1984 | Meek .................. F16K 15/03 |
| | | | 137/312 |
| 4,477,053 A | * | 10/1984 | Jandrasi ............... F16K 25/04 |
| | | | 251/298 |
| 4,498,492 A | | 2/1985 | Carpentier |
| 4,635,899 A | | 1/1987 | Eshleman |
| 4,945,949 A | | 8/1990 | Carpentier |
| 5,241,989 A | | 9/1993 | Kalavitis |
| 5,305,985 A | | 4/1994 | Fendley et al. |
| 5,318,063 A | | 6/1994 | Muddiman |
| 5,822,984 A | * | 10/1998 | Park ..................... F01N 3/032 |
| | | | 137/315.16 |
| 5,890,700 A | | 4/1999 | Clarkson et al. |
| 6,886,594 B2 | * | 5/2005 | Mambrini ............ F01D 17/105 |
| | | | 137/559 |

OTHER PUBLICATIONS

Trident Airlock Valve Information Sheet, http://www.tridental-loysinc.com/pdfs/Trident-Valve-Info.pdf, Visited on Aug. 24, 2010.

\* cited by examiner

DOUBLE FLAP VALVE WITH QUICK-CHANGE REPLACEABLE WEAR SURFACE

TECHNICAL FIELD

The present disclosed subject matter relates to valves and more particularly to flap-gate valves for use in pneumatic conveying in an industrial environment.

BACKGROUND

Flap-gate valves are used in industrial settings to transport dry particulate matter. Essentially, they comprise a mechanical arm, pivotally mounted at one end and having a flap (also sometimes referred to herein as a "flapper") affixed to the other end. The arm rotates to move the flap into and out of engagement with the bottom opening of a structure known as a seat. When the flap is not engaged with the seat, any particulates in the seat are free to flow through the bottom opening. When the flap engages with the bottom opening of the seat, a seal is formed, preventing the contents of the seat from passing through the bottom opening. In other words, the seat is essentially a temporary receptacle with an opening at the top for receiving particulate matter, and a bottom which is open when the flap is not engaged and closed when the flap is engaged. In many cases, the width of the seat tapers down from the top to the bottom, in a funnel-like manner.

When connected in serial and operated in sequential fashion (a "double flap-gate valve"), flap-gate valves are capable of maintaining a pressure differential between two environments, while transporting matter across the environments. Given this application, a key aspect of such valves is to maintain an air-tight seal between the two environments. For example, flap-gate valves are used in the removal of dust accumulations in industrial plants, as key components in the discharge lines of vacuum dust collection systems. Over time, and particularly with abrasive particulates, the surfaces of the seat and/or flap are worn away and the flap is no longer able to form an air-tight seal with the seat. Flap-gate valves were originally used for dust collection and this improvement added to the ability of the valve to operate in new applications, such as pneumatic conveying.

The following background technology shows what we believe would be known to a worker skilled in the art of the present invention, and accordingly need not be detailed further herein:

U.S. Pat. No. 3,257,045: DUST TRAP AND VALVE THEREFOR, issued Jun. 21, 1966, discloses a dust trap and valve, and more specifically a dust valve which is said to allow the inspection, cleaning, and/or replacement of its wearing parts without disconnecting or removing the entire trap unit from its working position or completely disassembling the dust trap unit.

U.S. Pat. No. 4,304,254: DUST TRAP VALVE WITH REMOVEABLE DOUBLE LIFE DOOR AND VALVE SEAT MEMBER, issued Dec. 8, 1981. This patent discloses a dust valve for the discharge line of a dust collection system, including a removable closet with two wear surfaces and a coacting removable valve door with two wear surfaces mounted within the valve body. Once the coacting wear surfaces on the closet and the door are sufficiently worn that they need replacement, each element can be disconnected from its supporting structure, inverted, and then reconnected to the valve body so as to expose a new wear surface. The useful lives of these elements are thus doubled over conventional single wear surface closets and doors.

U.S. Pat. No. 4,307,747: DUST TRAP WITH REMOVABLE VALVE SEAT, issued Dec. 29, 1981, discloses a dust trap for bag houses and the like which is provided with an internal removable valve seat to facilitate replacement of the valve seat or regrinding of the valve surface. The valve seat and dust trap have complementary supporting parts to support the valve seat while it is being removed from or replaced in the dust trap.

U.S. Pat. No. 4,945,949: REDUCE HEIGHT DUST VALVE, issued Aug. 7, 1990. This patent discloses a dust trap comprising a pair of coaxially mounted dust valves. Each valve has a valve seat and flapper plate and actuator shaft which coacts with the flapper plate to cause it to initially slide and then pivot as the valve opens.

U.S. Pat. No. 5,241,989: REDUCED HEIGHT DOUBLE-FLAP DUST VALVE, issued Sep. 7, 1993, discloses a reduced-height dust valve used in a trap which utilizes a pair of said valves to remove dust from, for example, a vacuum line. The valve includes a body having a longitudinal flow path, a valve seat detachably mounted in the upper portion of the body and opposed flapper plates which seat against each other to close the valve or are rotated downwardly by actuator shafts to open the valve. The flapper plates define adjacent edges which seat against each other by a sliding action permitted by movement of one of the two actuator arms.

SUMMARY OF THE INVENTION

The invention disclosed herein includes replaceable wear surface for a flap-gate valve and methods for installing and replacing the same. The replaceable wear surface for a flap-gate valve allows the person acting as maintainer of a properly-equipped flap-gate valve to quickly and efficiently replace a component of the flap-gate valve which undergoes wear and tear during the normal operation of the flap-gate valve. This component is the sealing member of the seat. As is known in the art of flap-gate valves, an arm-mounted flap moves into and out of engagement with the seat to seal and unseal an opening in the seat, through which particulate matter flows during the normal operation of a flap-gate valve. Particulates, especially abrasive ones, wear away at this area of the seat and flap while flowing through the opening in the seat. Eventually, this destroys the ability for the seat and flap to form an airtight seal.

The inventors have also discovered that due to machining tolerances associated with metal surfaces used in conventional seats and flaps, the resulting seal is not completely airtight and has small air leaks due to gaps between the seat and flap that are a few thousandths of an inch. In high-pressure pneumatic conveying applications, small particles pass through these gaps at high velocity, enlarging the gaps, and causing the valve to fail in a short time period. Instead of taking the flap-gate valve assembly apart and replacing an entire seat and/or flap, or regrinding the surfaces thereof, the presently disclosed subject matter includes a replaceable wear surface for quickly swapping out a worn-out surface with a new one. Further, the replaceable wear surface may be made from abrasion-resistant material, such as ceramic or tungsten carbide, or a combination thereof. In certain embodiments that employ a combination of ceramic and tungsten carbide, tungsten carbide is located on portions of the replaceable wear surface that experience a direct impact when the flap-gate valve closes, while the ceramic is located on portions that do not encounter direct impact. This arrangement is advantageous because tungsten carbide can withstand impact and will not fracture, whereas ceramic is less expensive but will fracture more easily than tungsten carbide. The ceramic, tungsten carbide, or combination thereof, is vacuum bonded or fastened with epoxy to a corresponding surface, disclosed below.

Preferably, however, an air-tight sealing material, such as rubber, is used for the wear surface. In such embodiments, the air-tight sealing material is preferably vulcanized to a corresponding surface, disclosed below. The vulcanization process is performed in accordance with standard processes known in the art. Any material that gets trapped on the sealing surface will be compressed into the rubber when the flapper closes. That material is then expelled from the rubber when the flapper opens. The rubber is resilient, so this process can happen many times, with no leakage, before the rubber needs to be replaced. Accordingly, it is preferable to use an air-tight sealing material such as rubber to prevent air and particulates from passing through the seal at high velocity as described above.

In either case, the material selected in accordance with the present invention for the replaceable wear surface extends the life of the wear surface of the present invention beyond that of conventional nickel alloy or other metal surfaces used in the seats and/or flaps of conventional flap-gate valves.

One aspect of the present invention is a flat plate or "face" adapted to be incorporated into a flap-gate valve having a replaceable wear surface. The face has at least one slot or bore therethrough, the slot or bore being adapted to allow a bolt to pass through the face and attach the face to the bottom of a valve seat. The face also includes a frame with a border attached thereto. The frame and the border form an opening which allows material to pass through the seat and out of the valve. The border of the frame is the wear surface which engages and disengages with a flapper when the valve closes and opens. The border is made of air-tight sealing material or abrasion-resistant material. The preferred air-tight sealing material is rubber. The preferred abrasion-resistant material is ceramic or tungsten carbide, or a combination thereof. Preferably, the material of the border is rubber, because, as disclosed above, the inventors have discovered that rubber provides an air-tight seal which prevents particulates from passing through the seal at all, eliminating the occurrence of channels forming in the material of the border and the flapper. Also, preferably the face has at least two indented sections forming slots, each adapted to allow a bolt to pass through the face and attach the face to the bottom of a valve seat.

Another aspect of the present invention is a flapper adapted to be incorporated into a flap-gate valve having a replaceable wear surface. The flapper comprises a plate attached to a piston-controlled arm. The plate of the flapper is shaped such that it may form a sealing engagement with a correspondingly-shaped wear surface of a valve seat. In a further aspect of the present invention, the plate of the flapper is circular in shape.

Another aspect of the present invention is a seat of a flap-gate valve adapted to work in conjunction with a replaceable wear surface, the valve seat comprising four side panels joined together, forming a substantially rectangular wall, and a bottom panel attached to the lower edge of the wall. Preferably, the cross-sectional area of the rectangular wall tapers down in size from the top edge of the wall to the bottom panel. The bottom panel includes a frame forming an opening. In addition, the bottom panel includes at least one bore adapted to accommodate a bolt for attaching the above-referenced face to the bottom panel of the valve seat.

In a further aspect of the invention, the bottom panel includes at least two bores, each adapted to accommodate a bolt for attaching the above-referenced face to the bottom panel of the valve seat. In yet a further aspect of the invention, the bottom panel further includes two more bores, each having a bolt therethrough, and on each said bolt, a metal tab adapted to hold a portion of the face against the bottom panel.

Another aspect of the invention is a flap-gate valve with a replaceable wear surface, the flap-gate valve including the above-described seat; the above-described face attached to the bottom panel of the seat by at least one bolt; and the above-referenced piston-controlled arm and flapper adapted to sealingly engage and disengage with the wear surface of the face.

Another aspect of the invention is a method of replacing components of a conventional flap-gate valve with components adapted to work in conjunction with a replaceable wear surface, the steps of the method comprising:
  removing the existing valve seat; and
  installing the valve seat disclosed in the aspects of the invention detailed above.

Another aspect of the invention is a method of replacing components of a conventional flap-gate valve with components adapted to work in conjunction with a replaceable wear surface, the steps of the method comprising:
  removing the existing valve seat and arm; and
  installing the valve seat and arm disclosed in the aspects of the invention detailed above.

Another aspect of the invention is a method of replacing components of a conventional flap-gate valve with components adapted to work in conjunction with a replaceable wear surface, the steps of the method comprising:
  removing the existing valve seat and flapper; and
  installing the valve seat and flapper disclosed in the aspects of the invention detailed above.

Another aspect of the invention is a method of replacing components of a conventional flap-gate valve with components adapted to work in conjunction with a replaceable wear surface, the steps of the method comprising:
  removing the existing valve seat, arm, and flapper; and
  installing the valve seat, arm, and flapper disclosed in the aspects of the invention detailed above.

Another aspect of the invention is a method of replacing a replaceable wear surface in a flap-gate valve adapted to work in conjunction with a replaceable wear surface, the steps of the method comprising:
  removing a face from the valve seat, the face having a wear surface attached thereto; and
  installing a replacement face to the valve seat, the replacement face having a replacement wear surface attached thereto.

Another aspect of the invention is a method of replacing a replaceable wear surface in a flap-gate valve adapted to work in conjunction with a replaceable wear surface, the steps of the method comprising:
  removing a face from the bottom panel of the valve seat, the face having a wear surface attached thereto; and
  installing a replacement face to the bottom panel of the valve seat, the replacement face having a replacement wear surface attached thereto.

Another aspect of the invention is a method of replacing a replaceable wear surface in a flap-gate valve adapted to work in conjunction with a replaceable wear surface, the steps of the method comprising:
  loosening bolts connecting a face having a wear surface to the bottom panel of the seat in the valve;

sliding the face out of engagement with the seat;

sliding a replacement face having a replacement wear surface into engagement with the seat;

tightening bolts connecting the replacement face having a replacement wear surface to the bottom of the seat.

Another aspect of the invention is a method of replacing a replaceable wear surface in a flap-gate valve adapted to work in conjunction with a replaceable wear surface, the steps of the method comprising:

removing bolts connecting a face having a wear surface to the seat in the valve;

moving the face out of engagement with the seat;

moving a replacement face having a replacement wear surface into engagement with the seat;

inserting and tightening bolts connecting the replacement face having a replacement wear surface to the bottom of the seat.

Another aspect of the invention is a method of replacing a replaceable wear surface in a flap-gate valve adapted to work in conjunction with a replaceable wear surface, the steps of the method comprising:

disconnecting and removing the arm from the shaft in the valve and/or disconnecting and removing the flapper from arm in the valve;

disengaging all screws and/or bolts from the seat in the valve;

removing the seat from the flap-gate valve;

placing a replacement seat adapted to work in conjunction with a replaceable wear surface into the location previously occupied by the previous seat;

engaging all screws and bolts with the new seat, thereby securing the new seat in place in the flap-gate valve;

attaching a replacement arm and/or flapper, both adapted to work in conjunction with a replaceable wear surface, to the shaft in the flap-gate valve.

Another aspect of the invention is a method of replacing a replaceable wear surface in a flap-gate valve adapted to work in conjunction with a replaceable wear surface, the steps of the method comprising:

disconnecting an arm in the valve from a shaft in the valve;

removing the arm and flapper from the valve;

disengaging all screws and/or bolts from the seat in the valve;

removing the seat from the flap-gate valve;

placing a replacement seat adapted to work in conjunction with a replaceable wear surface into the location previously occupied by the previous seat;

engaging all screws and bolts with the new seat, thereby securing the new seat in place in the flap-gate valve;

attaching a replacement arm and flapper, both adapted to work in conjunction with a replaceable wear surface, to the shaft in the flap-gate valve.

These and other aspects of the present invention will become readily apparent from the following detailed description taken in conjunction with the accompanying drawings.

DETAILED DESCRIPTION OF THE INVENTION WITH REFERENCE TO THE DRAWINGS

This discussion relates to an exemplary flap-gate valve which can house prior-art components OR components adapted to work in conjunction with a replaceable wear surface, in accordance with the present invention. Indeed, the ability to retrofit an existing flap-gate valve to include components in accordance with the present invention is an important feature hereof. Throughout the description of FIGS. 1 through 7, which relate to a first style of flap-gate valve, items referred to with a two-digit number are common across the figures. They refer to components of the flap-gate valve that remain the same, while other components change from prior art components (labeled in a 1xx format) to components adapted to work in conjunction with a replaceable wear surface (labeled in a 2xx format). Throughout the description of FIGS. 8 through 14, which relate to another style of flap-gate valve, items referred to in the 3xx format refer to components of that style flap-gate valve that are common across FIGS. 8 through 14. In FIGS. 8 through 14, other components change from prior-art components (labeled in a 4xx format) to components adapted to work in conjunction with a replaceable wear surface (labeled in a 5xx format)

Figure 1:
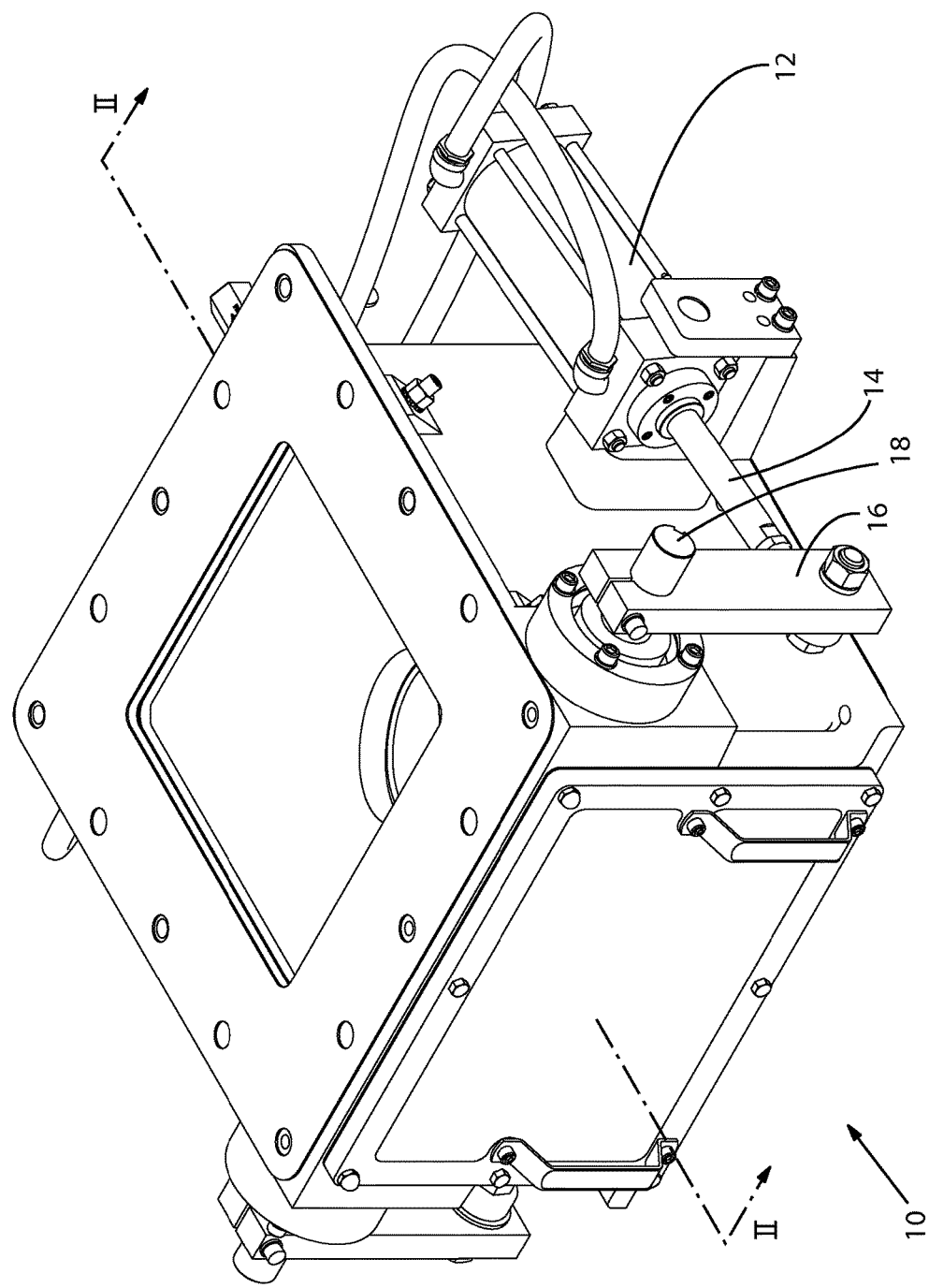
FIG. 1 is a perspective view of the outside of a flap-gate valve which includes or may be retrofitted to include a replaceable wear surface in accordance with the present invention.

FIG. 1 is a perspective view of the outside of a flap-gate valve 10. The flap-gate valve 10 includes a piston cylinder 12, a piston 14, and a connecting rod 16 between an end of the piston 14 and a shaft 18. The shaft 18 passes through the valve to move an arm and flapper (not shown here), as disclosed with reference to the later figures. The flap-gate valve 10 is just one example of a flap-gate valve that can contain the necessary parts to work in conjunction with a replaceable wear surface in accordance with the present invention. That is, the exterior components of the flap-gate valve 10 shown in FIG. 1 need not be changed in a process of retrofitting the flap-gate valve to contain components that work in conjunction with a replaceable wear surface, in accordance with the invention. Accordingly, FIG. 1 is representative of a flap-gate valve with conventional parts that do not work in conjunction with a replaceable wear surface in accordance with the invention, and yet it is also representative of a flap-gate valve that does include the components needed to operate in conjunction with a replaceable wear surface according to the present invention. It is also to be noted that the flap-gate valve 10 is shown alone. In pressure pneumatic conveying, at least one other flap-gate valve is stacked above or below flap-gate valve 10, and the valves operate in a sequential fashion, as a double flap-gate valve. The operation of a double flap-gate valve is discussed in the references cited in the Background section hereinabove, and accordingly will be understood by those skilled in the art as a context in which the present invention may desirably be implemented. In vacuum pneumatic conveying, a single flap-gate valve 10 is used.

Figure 2:
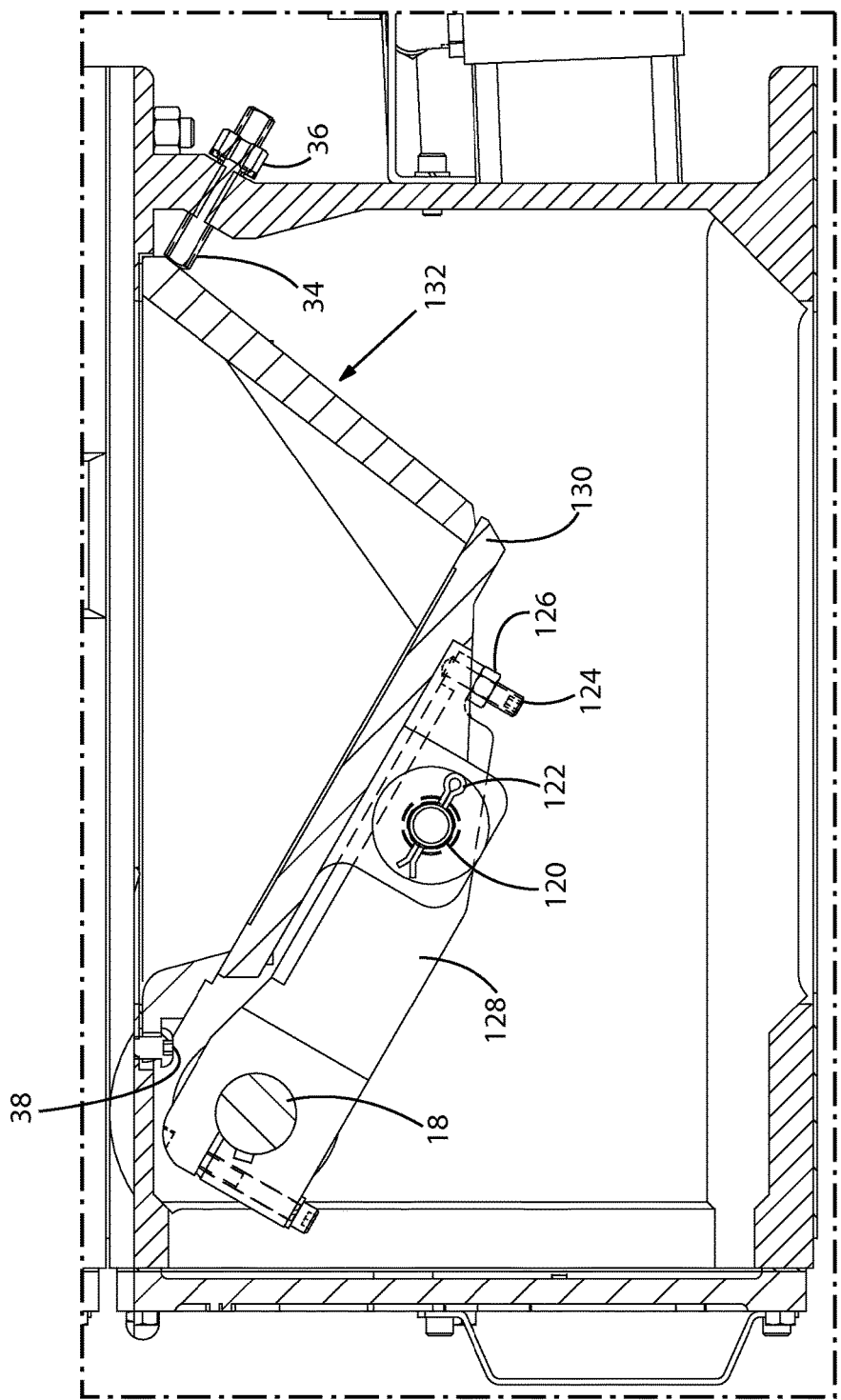
FIG. 2 is a cross-sectional view of the flap-gate valve of FIG. 1, having a prior-art valve seat, flapper, and arm installed. The cross-sectional view is taken along line II-II of FIG. 1.

FIG. 2 is a cross-sectional view of a flap-gate valve having a prior art seat 132, flapper 130, and arm 128. The cross-sectional view is taken along line II-II of FIG. 1. Arm 128 is connected at one end to shaft 18, which rotates in correspondence with the motion of connecting rod 16 and piston 14, both of which are shown in FIG. 1. Flapper 130 is attached to the opposite end of arm 128, by rod 120 and pin 122. Bolt 124 and nut 126 control the pivoting action of the flapper 130. The flapper 130 is shown in sealing engagement with seat 132. Thus, seat 132 is closed and any particles held inside it are retained unless and until piston 14 moves, causing connecting rod 16 to rotate shaft 18, in turn rotating arm 128 and moving flapper 130 out of sealing engagement with the seat 132. The engagement and disengagement of the flapper 130 and the seat 132 during the normal operation the flap-gate valve wears down the mating surfaces of the flapper 130 and seat 132.

Figure 3:
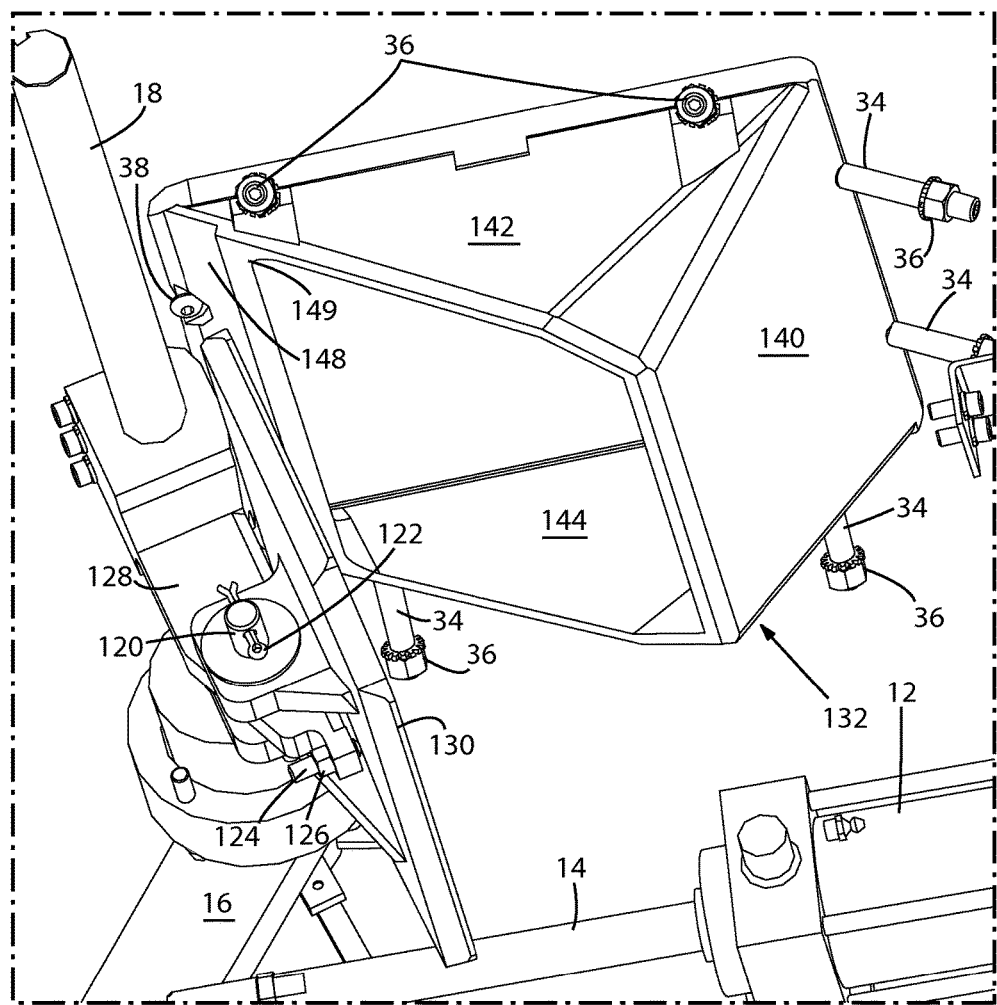
FIG. 3 is a perspective view of the prior-art valve seat, flapper, and arm of FIG. 2. Extraneous components of the flap-gate valve are omitted from the depiction for clarity.
Figure 4:
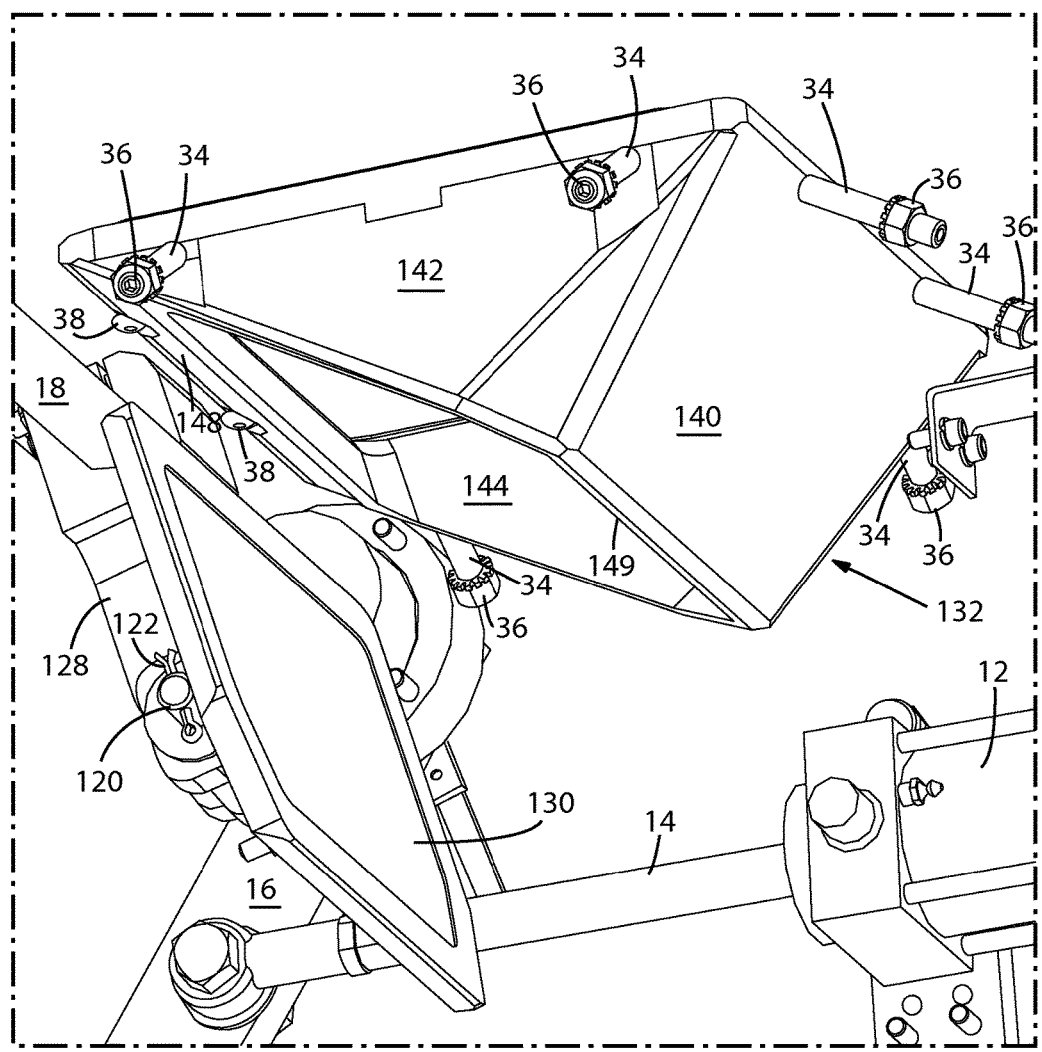
FIG. 4 is also a perspective view of the prior-art valve seat, flapper, and arm of FIG. 2. Again, extraneous components of the flap-gate valve are omitted for clarity.

In pneumatic conveying applications, the pressures involved (typically up to about 40 psi) cause channels to form in the mating surfaces, deteriorating and eventually destroying the seal that normally forms when flapper 130 engages with seat 132. In actuality, there is never a completely airtight seal. Even with a newly manufactured flapper 130 and seat 132, when closed together, there is a small amount of leakage through a few thousandths of an inch gap due to machining limitations in the metal, typically nickel chromium, used to form the flapper 130 and seat 132. As can be seen, bolt 34 passes through a wall in the housing of the flap-gate valve and abuts the valve seat, holding it in place. Nut 36 holds bolt 34 in place. In addition, on the opposite side of seat 132, screw 38 also holds seat 132 in place. As shown in FIGS. 3 and 4, there are actually multiple such screws and bolts holding seat 132 in place.

FIG. 3 is a perspective view of the prior art seat 132, flapper 130, and arm 128 of FIG. 2. Extraneous components of the flap-gate valve are removed for clarity. As discussed above, there are multiple screws 38, bolts 34, and nuts 36 holding seat 132 in place. The walls of the flap-gate valve through which these screws 38 and bolts 34 pass are removed to provide easier viewing of internal components of the flap-gate valve. Seat 132 is shown with the flapper 130 disengaged from it. This is because piston 14 extended, moving connecting rod 16, which in turn rotated shaft 18, which caused arm 128 to rotate clockwise.

As can be seen, any material dropped into the seat 132 from above would quickly fall through, due to the opening in the bottom of the seat 132. The seat is essentially wedge-shaped, having a front panel 140, a left panel 142, a right panel 144, and a bottom panel 148 which slants downward and includes a large frame 149 providing an opening through which particulates pass when the flapper 130 is not engaged with the seat 132. FIG. 4 provides a view of the components from a slightly different angle. As with FIG. 3, extraneous components of the flap-gate valve are removed for clarity. The mating surface of flapper 130 is shown. It engages with the seat 132 to close the opening formed by frame 149. As discussed above, in this prior art flapper 130 and seat 132, metal such as nickel chromium is used for at least the mating surfaces.

Figure 5:
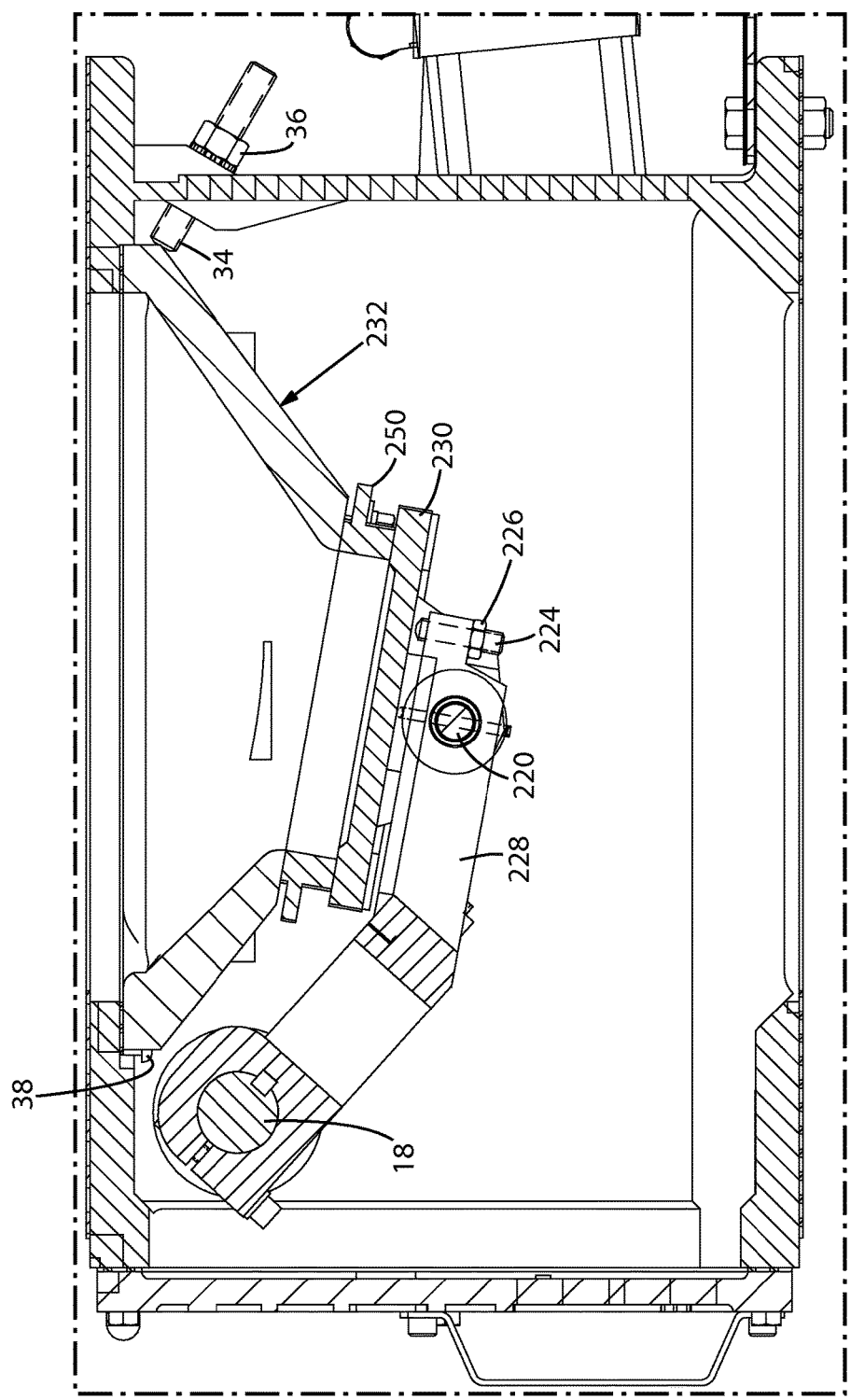
FIG. 5 is a cross-sectional view of the flap-gate valve of FIG. 1, having a valve seat, face, flapper, and arm according to an embodiment of the present invention installed. The cross-sectional view is taken along line II-II of FIG. 1.

FIG. 5 is a cross-sectional view of a flap-gate valve having a seat 232, face 250, flapper 230, and arm 228 according to an embodiment of the present invention. Unlike arm 128, which is substantially straight, arm 228 angles slightly towards seat 232 at a point about midway along its length. Flapper 230 is attached to arm 228 by a rod 220 and pin. Bolt 224 and nut 226 control the pivoting action of the flapper 230. Flapper 230 does not engage directly with seat 232, but instead engages with a replaceable face with a wear surface, as shown in more detail in FIGS. 5 and 6. Like prior art seat 132, seat 232 is held in place by the same screws 38, bolts 36, and nuts 34 used to hold prior art seat 132 in place. This is important because it allows a prior art seat 132 to be conveniently replaced with seat 232. Additionally, since shaft 18 is the same shaft used to rotate prior art arm 128, prior art arm 128 and flapper 130 can be removed and be replaced with arm 228 and flapper 230. The result is a retrofitted flap-gate valve adapted to use replaceable wear surfaces according to the present invention.

Figure 6:
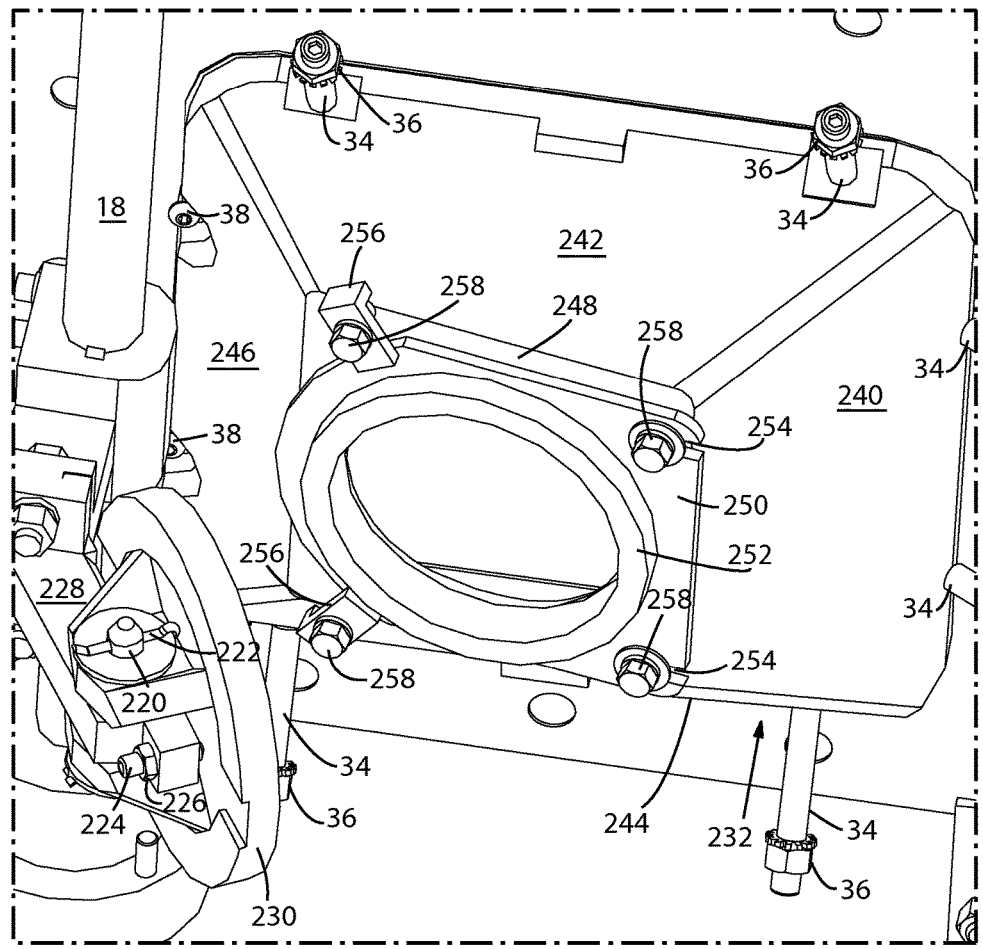
FIG. 6 is a perspective view of the valve seat, face, flapper, and arm of FIG. 5. Extraneous components of the flap-gate valve are omitted from this depiction for clarity.

FIG. 6 is a perspective view of the seat 232, face 250, flapper 230, and arm 228 of FIG. 5. Extraneous components of the flap-gate valve are removed for clarity. Flapper 230 is connected to arm 228 by rod 220 and pin 222. Bolt 224 and nut 226 control the pivoting action of the flapper 230. Arm 228 is connected to shaft 18, which rotates to move arm 228 and flapper 230 into and out of sealing engagement with wear surface 252 on face 250. The wear surface 252 is a rubber border around a circular frame in face 250. Through the frame is an opening through which material passes when flapper 230 is not engaged with the wear surface 252 of face 250. Face 250 includes, on one side, indented sections 254, which provide slots through which bolts 258 pass, holding the face 250 against bottom panel 248 of seat 232. Additional bolts 258 pass through metal tabs 256 which hold the portion of face 250 opposite indented sections 254 against the bottom panel 248 of seat 232. By loosening bolts 258, tabs 256 are disengaged with face 250, and face 250 can be slid towards back panel 246 of seat 232 until face 250 is released. At that point, a replacement face can be installed by reversing the process. Unlike prior art seat 132, seat 232 is not wedge-shaped. Seat 232 includes a front panel 240, a left panel 242, a right panel 244 (not shown), a back panel 246, and a bottom panel 248, which face 250 attaches to. Bottom panel 248 includes a frame for an opening, which would be completely covered by face 250, but for the opening in face 250 bordered by wear surface 252. The wear surface 252 is rubber, such as ENDURAFLEX made by Blair Rubber Company of Seville, Ohio, and is bonded to face 250.

Figure 7:
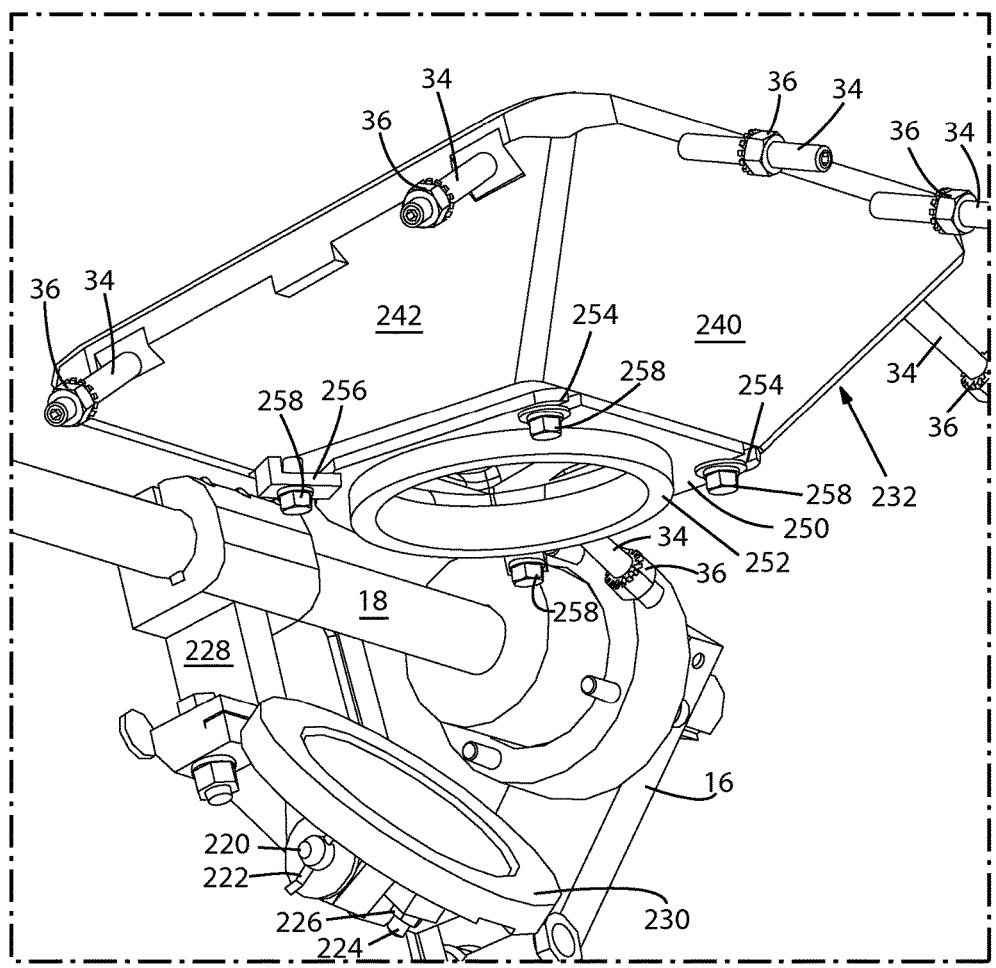
FIG. 7 is a perspective view of the valve seat, face, flapper, and arm of FIG. 5. Again, extraneous components of the flap-gate valve are omitted for clarity.

The rubber wear surface 252 generates an air-tight seal when flapper 230 engages with it. This prevents the formation of channels, described in connection with prior art seat 132 flapper 130. Other embodiments use ceramic or tungsten carbide, or a combination thereof, as a wear surface, instead of rubber. Ceramic and tungsten carbide are more abrasion-resistant than nickel chromium. While ceramic and tungsten carbide do not prevent the formation channels as described above, due to its increased durability and abrasion-resistance over nickel chromium, it takes significantly longer for channels to deteriorate the wear surface and destroy the ability to form a seal. FIG. 7 is a perspective view of the seat 230, face 250, flapper 230, and arm 228 of FIG. 5. Again, extraneous components of the flap-gate valve are removed for clarity. From this slightly different perspective, the mating surface of flapper 230 is visible. As can be seen, flapper 230 is circular in shape, to engage with the ring-like wear surface 252. In other embodiments, the flapper is not necessarily circular and the wear surface and opening in face is not necessarily ring-like or circular.

Figure 8:
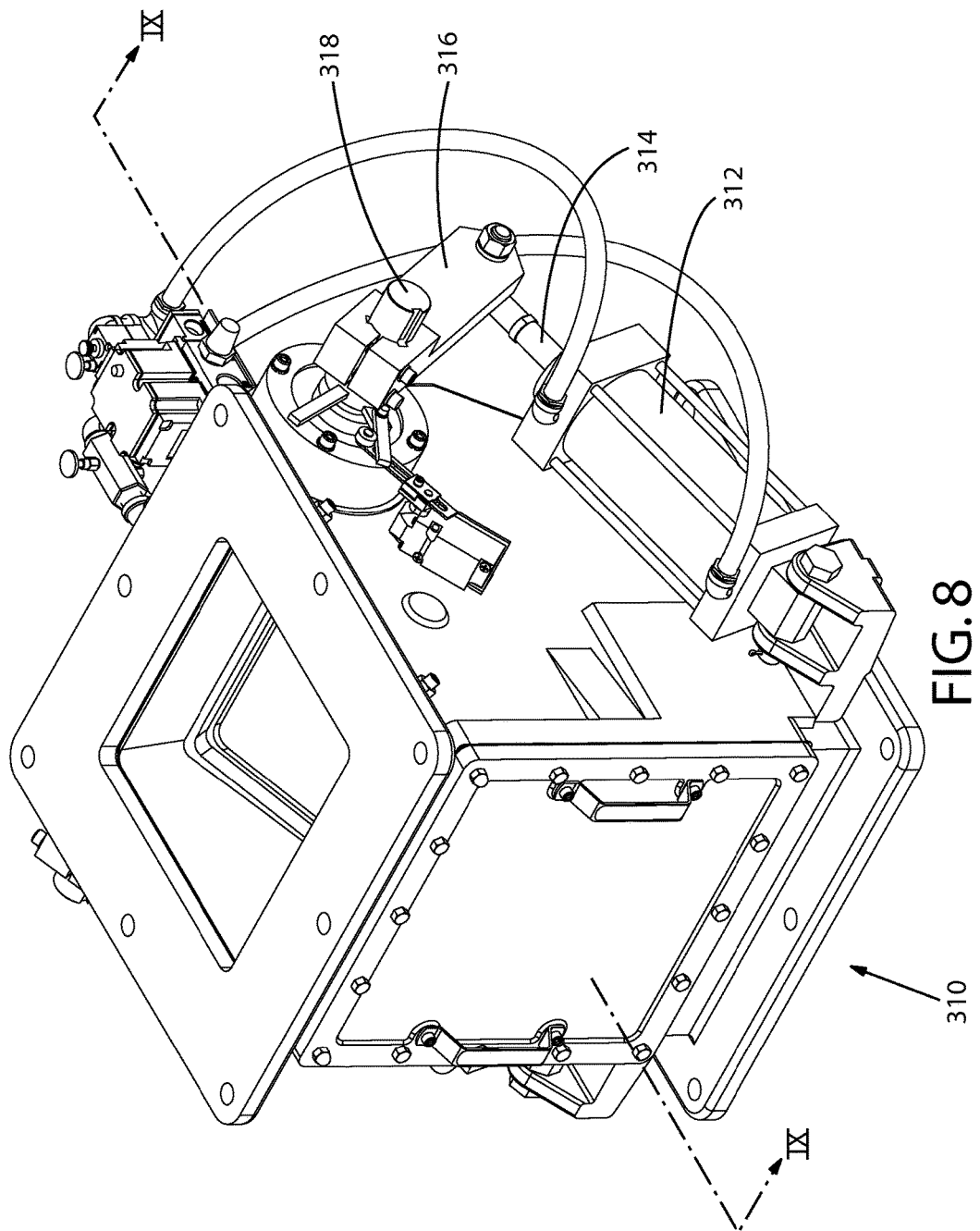
FIG. 8 is a perspective view of the outside of another style of flap-gate valve, differing from the style shown in FIG. 1. This flap-gate valve includes, or may be retrofitted to include, a replaceable wear surface in accordance with the present invention.

FIG. 8 is a perspective view of the outside of another style of flap-gate valve 310. The flap-gate valve 310 includes a piston cylinder 312, a piston 314, and a connecting rod 316 between an end of the piston 314 and a shaft 318. The shaft 318 passes through the valve 310 to move an arm and flapper (not shown here), as disclosed with reference to the later figures. The exterior components of the flap-gate valve 310 shown in FIG. 8 need not be changed in a process of retrofitting the flap-gate valve 310 to contain components that work in conjunction with a replaceable wear surface, in accordance with the invention. Accordingly, FIG. 8 is representative of a flap-gate valve with conventional parts that do not work in conjunction with a replaceable wear surface in accordance with the invention, and is equally representative of a flap-gate valve that does include the components needed to operate in conjunction with a replaceable wear surface according to the present invention. The flap-gate valve 310 is shown alone. In pressure pneumatic conveying, at least one other flap-gate valve is stacked above or below flap-gate valve 310, and the valves operate in a sequential fashion, as a double flap-gate valve. The operation of a double flap-gate valve is discussed in the Background section. In vacuum pneumatic conveying, a single flap-gate valve 310 is used.

Figure 9:
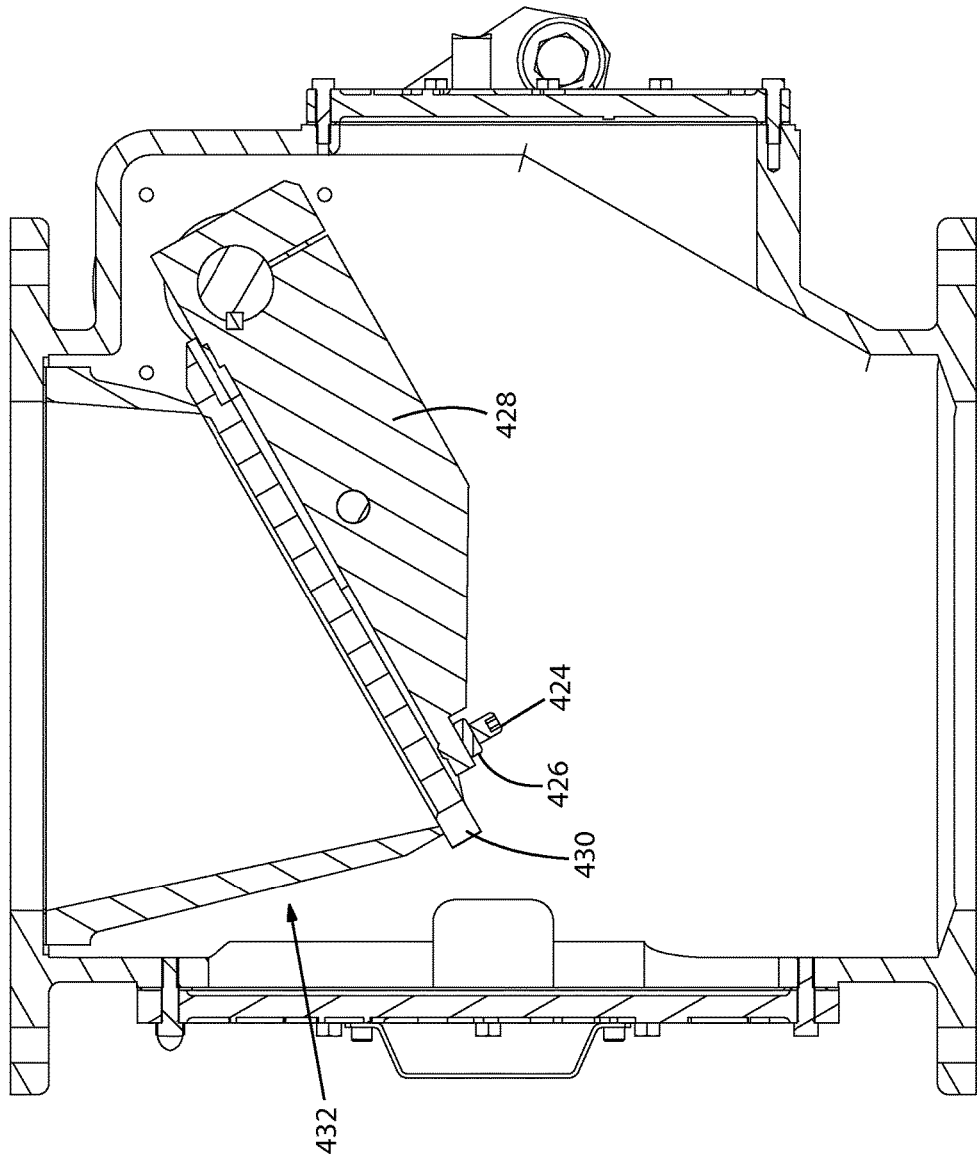
FIG. 9 is a cross-sectional view of the flap-gate valve of FIG. 8, having a prior-art valve seat, flapper, and arm installed. The cross-sectional view is taken along line IX-IX of FIG. 8.

FIG. 9 is a cross-sectional view of the flap-gate valve of FIG. 8, having a prior art seat 432, flapper 430, and arm 428 installed. The cross-sectional view is taken along line IX-IX of FIG. 8. Arm 428 is connected at one end to shaft 318, which rotates in correspondence with the motion of connecting rod 316 and piston 314, which are shown in FIG. 8. Flapper 430 is attached to the opposite end of arm 428, by rod 420 and pin 422, which are visible from the opposite side of the valve, in FIGS. 10 and 11. Bolt 424 and nut 426 control the pivoting action of the flapper 430. The flapper 430 is shown in sealing engagement with seat 432. Thus, seat 432 is closed and any particles held inside it are retained unless and until piston 314 moves, causing connecting rod 316 to rotate shaft 318, in turn rotating arm 428 and moving flapper out of sealing engagement with the seat 432. The engagement and disengagement of the flapper 430 and the seat 432 during the normal operation the flap-gate valve wears down the mating surfaces of the flapper 430 and seat 432.

Figure 10:
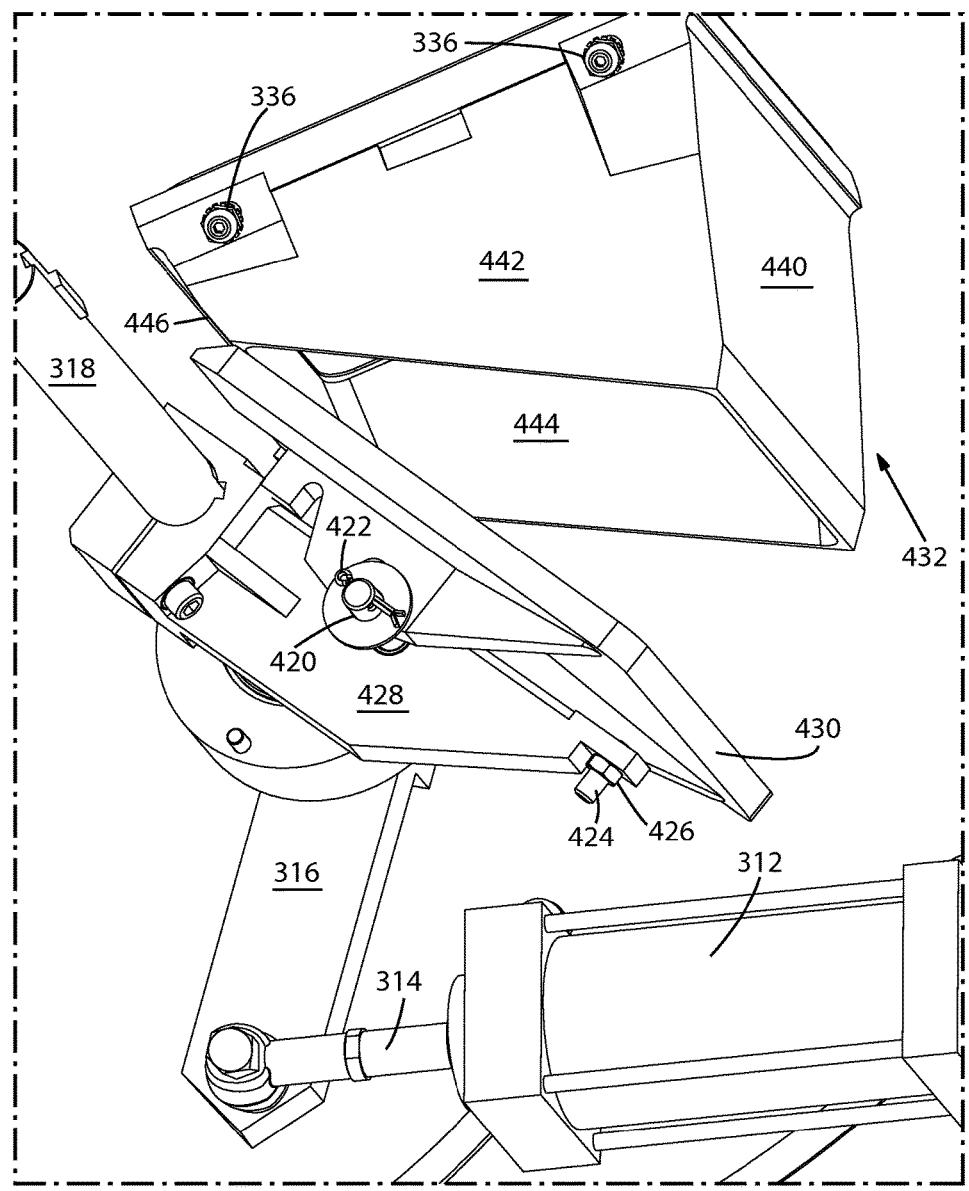
FIG. 10 is a perspective view of the prior-art valve seat, flapper, and arm of FIG. 9. Extraneous components of the flap-gate valve are omitted from this depiction for clarity.
Figure 11:
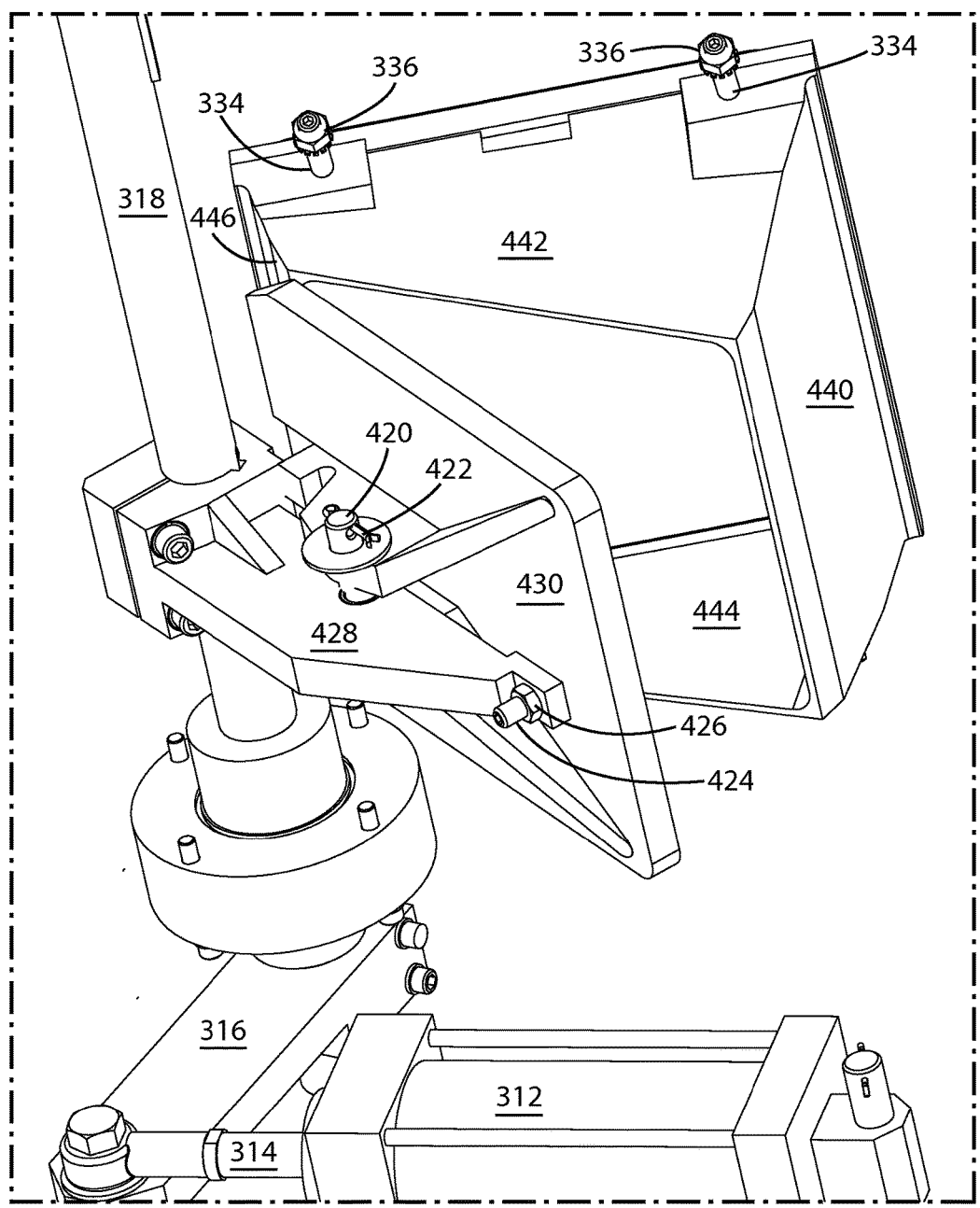
FIG. 11 is also perspective view of the prior-art valve seat, flapper, and arm of FIG. 9. Again, extraneous components of the flap-gate valve are omitted for clarity.

FIG. 10 is a perspective view of the prior art seat 132, flapper 130, and arm 128 of FIG. 9. Extraneous components of the flap-gate valve are removed for clarity. Bolts 334 (shown in FIG. 11) and nuts 336 hold seat 432 in place. Seat 432 is shown with the flapper 430 disengaged from it. This is because piston 314 has extended, moving connecting rod 316, which in turn rotated shaft 318, which caused arm 428 to rotate clockwise. Seat 432 includes a front panel 440, a left panel 442, a right panel 444, and a back panel 446. When flapper 430 is not engaged with the seat 432, material deposited into the seat will freely pass through. From this perspective, rod 420 and pin 422 can be seen, connecting arm 428 to flapper 430. Bolt 424 and nut 426 are also visible. FIG. 11 provides a view of the components from a slightly different angle. As with FIG. 10, extraneous components of the flap-gate valve are removed for clarity. Bolts 334 are visible from this perspective. Additional bolts and nuts are present on the opposite side of the seat 432, holding it in position on that side as well. This prior art flapper 430 and seat 432, are made of metal, such as nickel chromium.

Figure 12:
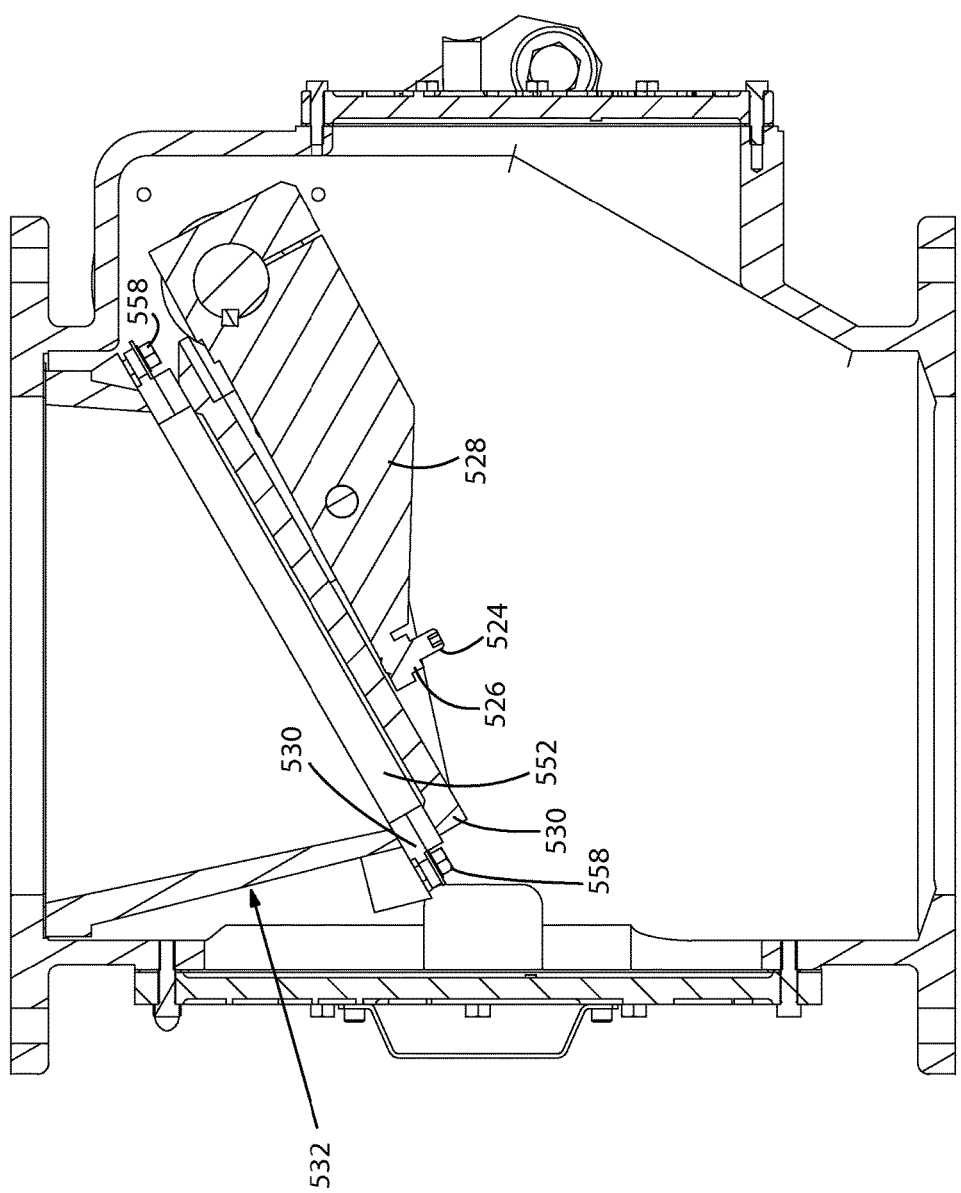
FIG. 12 is a cross-sectional view of the flap-gate valve of FIG. 8, having a valve seat, face, flapper, and arm according to an embodiment of the present invention installed. The cross-sectional view is taken along line IX-IX of FIG. 8.
Figure 13:
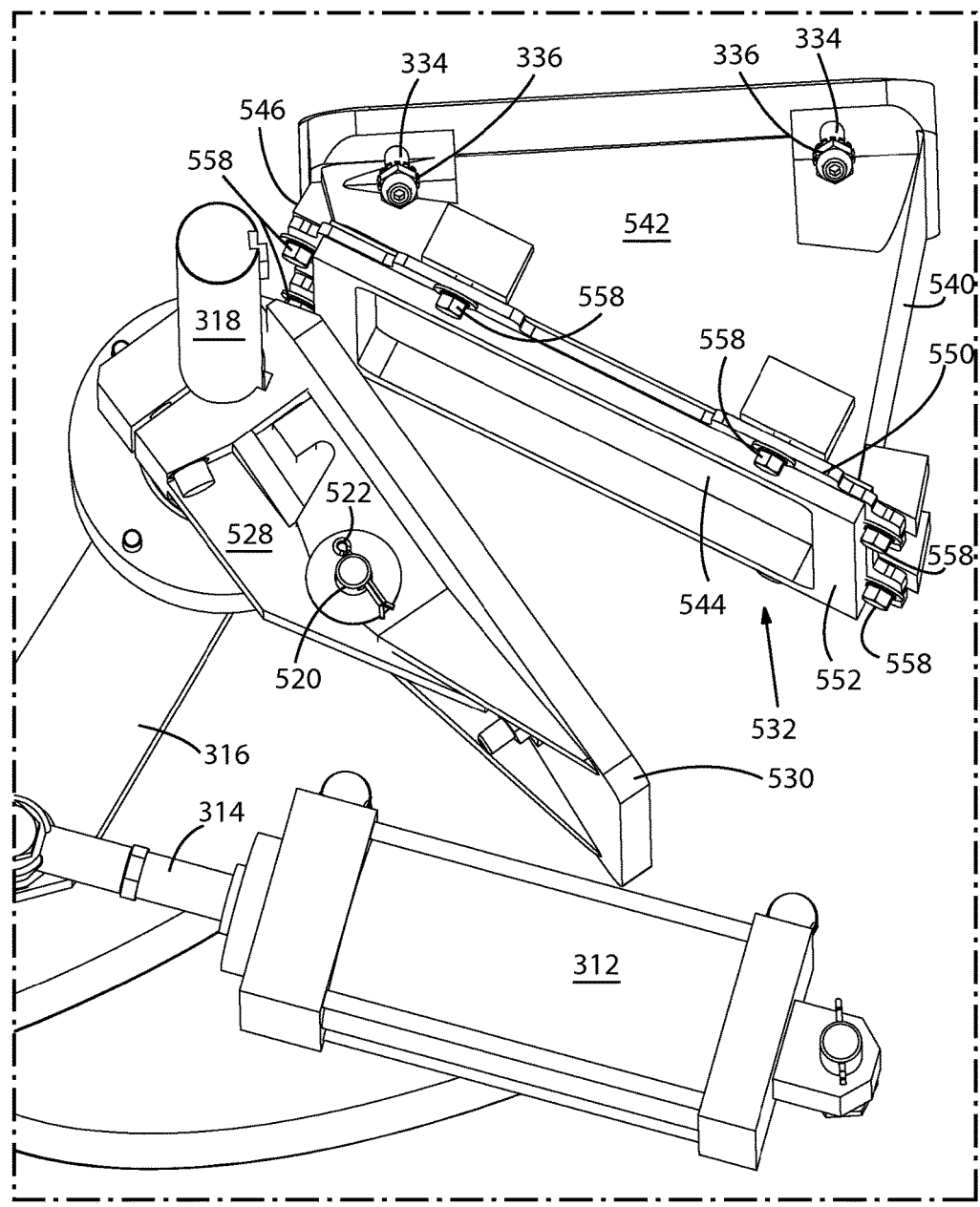
FIG. 13 is a perspective view of the valve seat, face, flapper, and arm of FIG. 8. Extraneous components of the flap-gate valve are omitted for clarity.
Figure 14:
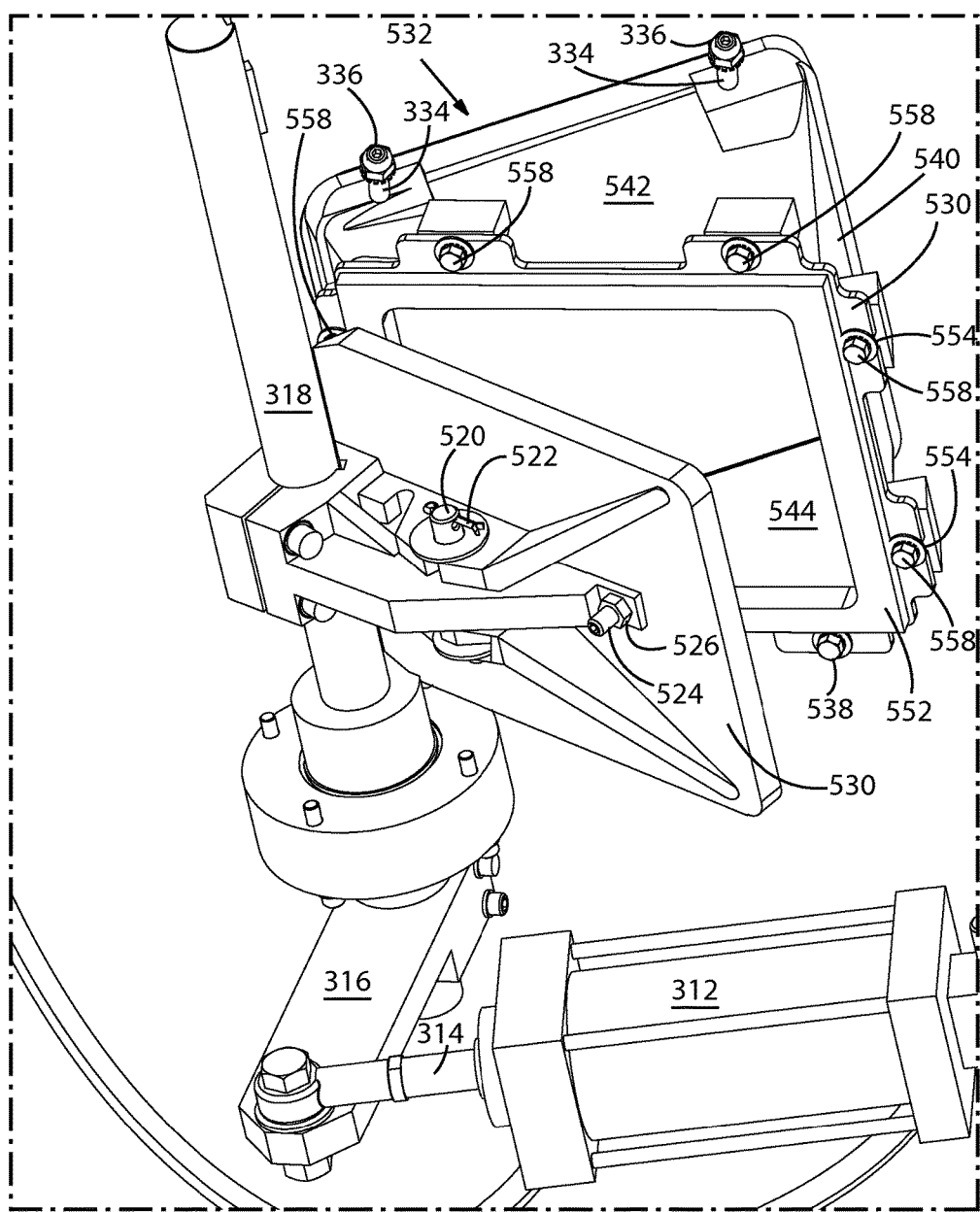
FIG. 14 is a perspective view of the valve seat, face, flapper, and arm of FIG. 8. Again, extraneous components of the flap-gate valve are omitted for clarity.

FIG. 12 is a cross-sectional view of the flap-gate valve of FIG. 8, having a seat 532, face 550, flapper 530, and arm 528 according to an embodiment of the present invention installed. Flapper 530 is attached to arm 528 by a rod 520 and pin 522, which are not visible here, but are shown in FIGS. 13 and 14. Bolt 524 and nut 526 control the pivoting action of the flapper 530. Flapper 530 does not engage directly with seat 532, but instead engages with a replaceable face 550 with a wear surface 552, as shown in FIGS. 13 and 14. Since shaft 318 is the same shaft used to rotate prior art arm 428, prior art arm 428 and flapper 430 can be removed and be replaced with arm 528 and flapper 530. Prior art seat 432 can be replaced with seat 532. The result is a retrofitted flap-gate valve adapted to use replaceable wear surfaces according to the present invention. In certain embodiments, arm 528 and arm 428 are substantially identical or otherwise compatible with the replaceable face 550 and wear surface 552 and need not be replaced during the above-mentioned retrofitting of the flap-gate valve. Also, in some embodiments, flapper 530 and 428 are substantially identical or otherwise compatible with the replaceable face 550 and wear surface 552, and need not be replaced during the above-mentioned retrofitting of the flap-gate valve.

FIG. 13 is a perspective view of the seat 532, face 550, flapper 530, and arm 528 of FIG. 12. Extraneous components of the flap-gate valve are removed for clarity. Flapper 530 is connected to arm 528 by rod 520 and pin 522. Bolt 524 and nut 526 control the pivoting action of the flapper 530. Arm 528 is connected to shaft 318, which rotates to move arm 528 and flapper 530 into and out of sealing engagement with wear surface 552 on face 550. The wear surface 552 is a rubber border around a rectangular frame in face 550. Through the frame is an opening through which material passes when flapper 530 is not engaged with the wear surface 552 of face 550. Face 550 includes, on one side, indented sections 554, which provide slots through which bolts 558 pass, holding the face 550 against seat 532. Bolts 558 also pass through additional portions of the face 550 that have holes therethrough for accommodating the bolts 558. By removing bolts 558, face 550 can be removed from seat 532. At that point, a replacement face can be installed by reversing the process. Seat 532 includes a front panel 540, a left panel 542, a right panel 544 (shown in FIG. 14), and a back panel 546. Face 550 is attached to these panels, as shown. As with wear surface 252, discussed above, wear surface 552 is rubber, such as ENDURAFLEX made by Blair Rubber Company of Seville, Ohio. Wear surface 552 is bonded to face 550. In preferred embodiments, there is also a bonded rubber surface on the opposite side of the face 550. The additional bonded rubber surface acts as an integral gasket that allows the installer to have a fool-proof method of installation. It also makes installation much easier and faster.

The rubber wear surface 552 generates an air-tight seal when flapper 530 engages with it. This prevents the formation of channels, described above. As with the first style of flap-gate valve, discussed with reference to FIGS. 1 through 7, other embodiments of the style of flap-gate valve shown in FIGS. 8 through 14 may use ceramic or tungsten carbide, or combination thereof, as a wear surface, instead of rubber. Ceramic and tungsten carbide are more abrasion-resistant than nickel chromium. Again, while ceramic and tungsten carbide do not prevent the formation channels as described above, due to their increased durability and abrasion-resistance over nickel chromium, it takes significantly longer for channels to deteriorate the wear surface and destroy the ability to form a seal. FIG. 14 is a perspective view of the seat 530, face 550, flapper 530, and arm 528 of FIG. 12. Again, extraneous components of the flap-gate valve are removed for clarity. From this perspective, wear surface 552 of face 550 can be seen more clearly.

Figure 15:
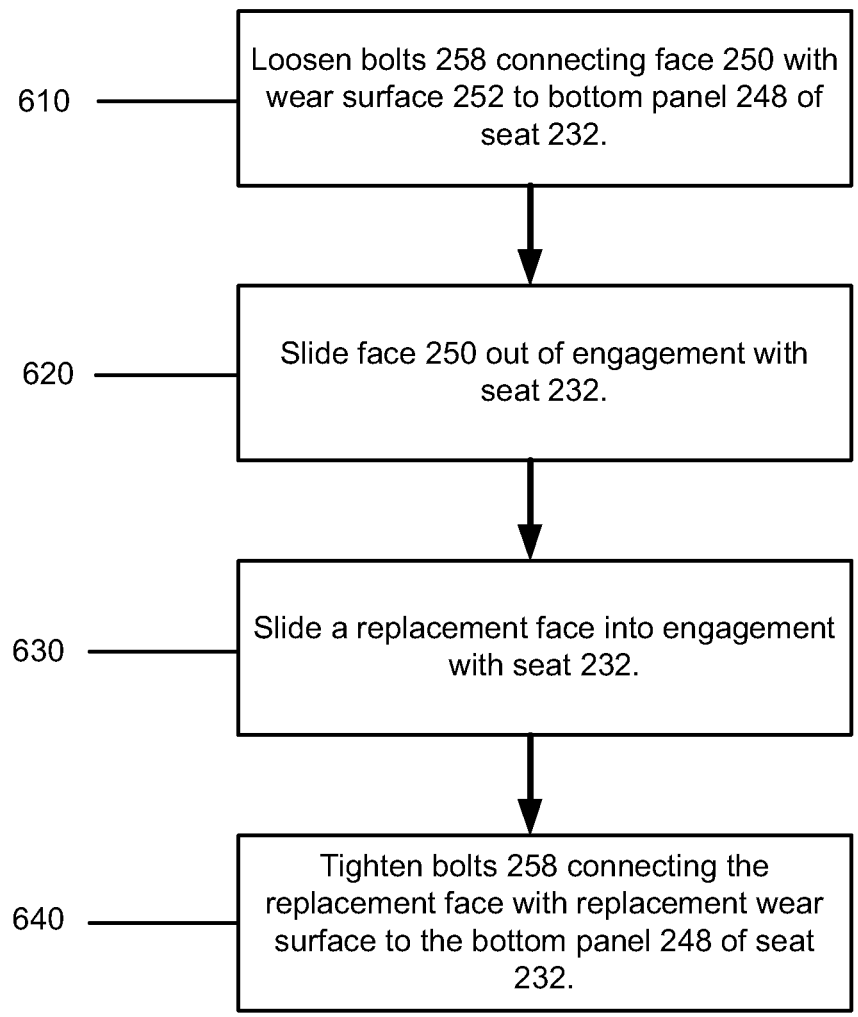
FIG. 15 is a flow chart of steps involved in a method of replacing a replaceable wear surface in accordance with the present invention. The steps of the method are provided with reference to the exemplary embodiment of the invention shown in FIGS. 5 through 7.

FIG. 15 is a flow chart of steps involved in a method of replacing a replaceable wear surface in accordance with the present invention. The steps of the method are provided with reference to the exemplary embodiment of the invention shown in FIGS. 5 through 7. Step 610 is to loosen bolts 258 connecting face 250 having wear surface 252 to bottom panel 248 of seat 232. The next step, 620, is to slide face 250 out of engagement with seat 232. At this point, it is free of the flap-gate valve and may be disposed of. The next step, 630 is to slide a replacement face having a replacement wear surface into engagement with seat 232. The next step, 640 is to tighten bolts 258 connecting the replacement face having a replacement wear surface to the bottom panel 248 of seat 232. In a preferred embodiment, the entire face 250 is not replaced. Instead, the worn-out wear surface 252 is removed from the face 250 and a new wear surface is bonded to the face 250.

Figure 16:
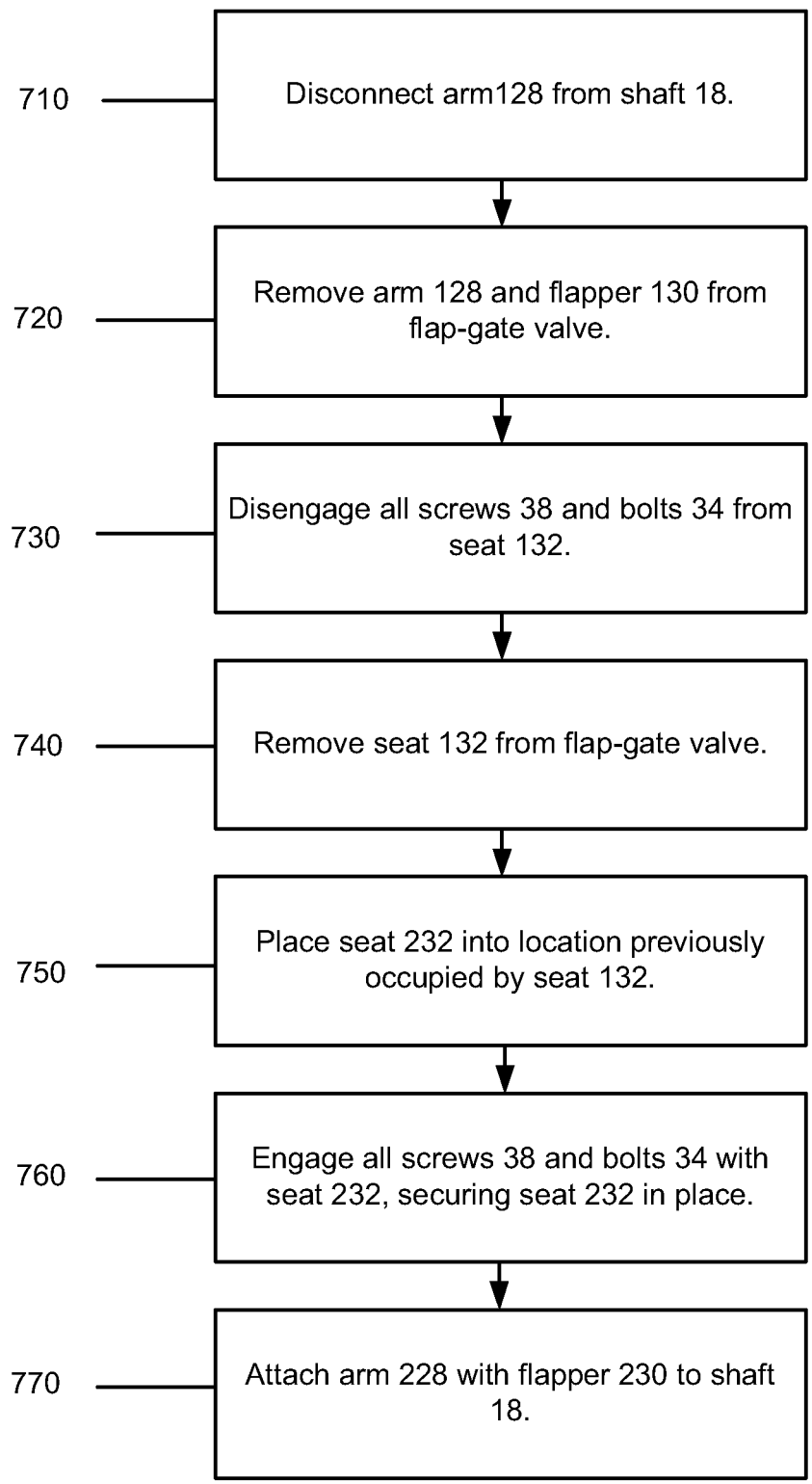
FIG. 16 is a flow chart of steps involve in retrofitting an existing flap-gate valve with components adapted to work in conjunction with a replaceable wear surface, in accordance with the present invention. The steps of the method relate to flap-gate valve and components disclosed in FIGS. 1 through 7.

FIG. 16 is a flow chart of steps involved in retrofitting an existing flap-gate valve with components adapted to work in conjunction with a replaceable wear surface, in accordance with the present invention. The steps of the method relate to flap-gate valve and components disclosed in FIGS. 1 through 7. Step 710 is to disconnect arm 128 from shaft 18. As will be appreciated, this also disconnects flapper 130, since flapper 130 is connected to arm 128. Step 720 is to remove arm 128 and flapper 130 from the flap-gate valve. Step 730 is to disengage all screws 38 and bolts 34 from seat 132. Step 740 is to remove seat 132 from the flap-gate valve. Next, step 740 is to place seat 232 into the location previously occupied by seat 132. Next, step 760 is to engage all screws 38 and bolts 34 with seat 232, thereby securing it in place in the flap-gate valve. Finally, step 770 is to attach arm 228 with flapper 230 to shaft 18, such that the flapper 230 is aligned with wear surface 252, such that they form a seal when flapper 230 engages with wear surface 252. In other embodiments, the order of the steps differ, such that the arm 128 and seat 132 are removed in the opposite order and/or the arm 228 and seat 232 are installed in the opposite order. In some embodiments, face 250 is already attached to seat 232 when seat 232 is secured into place, and in other embodiments, face 250 is attached after seat 232 is secured into place.

Figure 17:
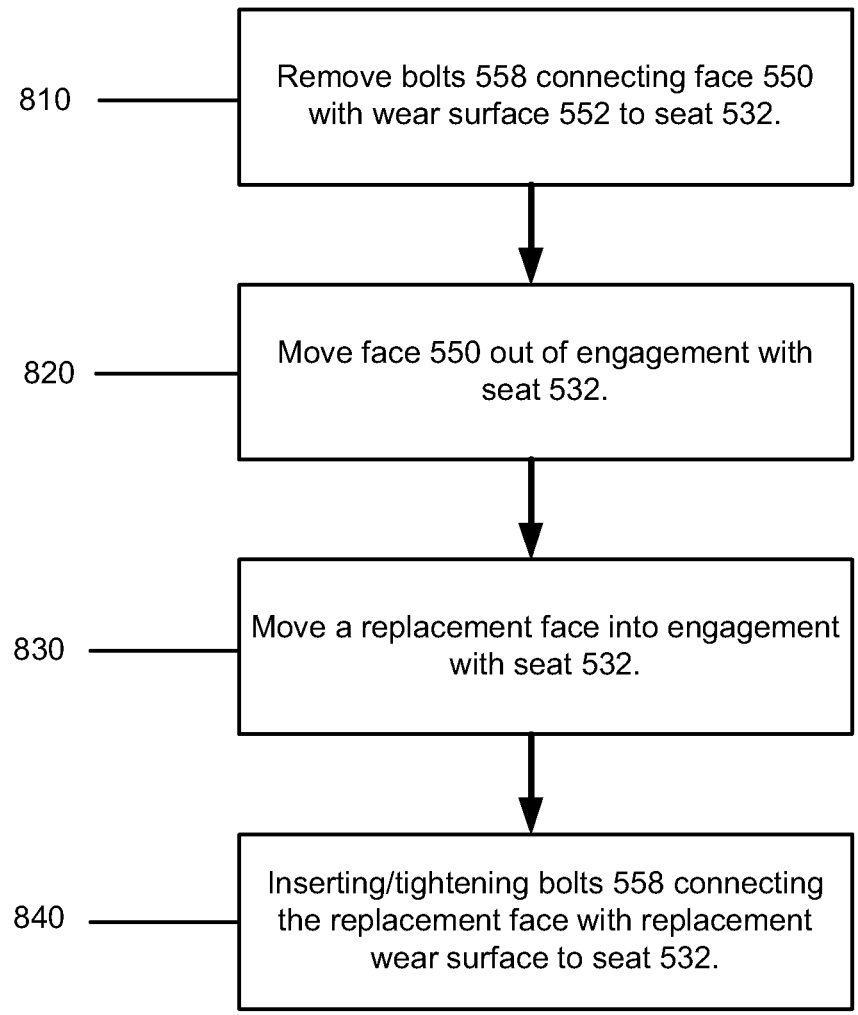
FIG. 17 is a flow chart of steps involved in a method of replacing a replaceable wear surface in accordance with the present invention. The steps of the method are provided with reference to the exemplary embodiment of the invention shown in FIGS. 12 through 14.

FIG. 17 is a flow chart of steps involved in a method of replacing a replaceable wear surface in accordance with the present invention. The steps of the method are provided with reference to the exemplary embodiment of the invention shown in FIGS. 12 through 14. Step 810 is to remove bolts 558 connecting face 550 having wear surface 552 to seat 532. The next step, 820, is to move face 550 out of engagement with seat 532. At this point, face 550 is free of the flap-gate valve and may be disposed of. The next step, 830 is to move a replacement face having a replacement wear surface into engagement with seat 532. The next step, 840 is to tighten bolts 558 connecting the replacement face having a replacement wear surface to seat 532. In a preferred embodiment, the entire face 550 is not replaced. Instead, the worn-out wear surface 552 is removed from the face 550 and a new wear surface is bonded to the face 550.

Figure 18:
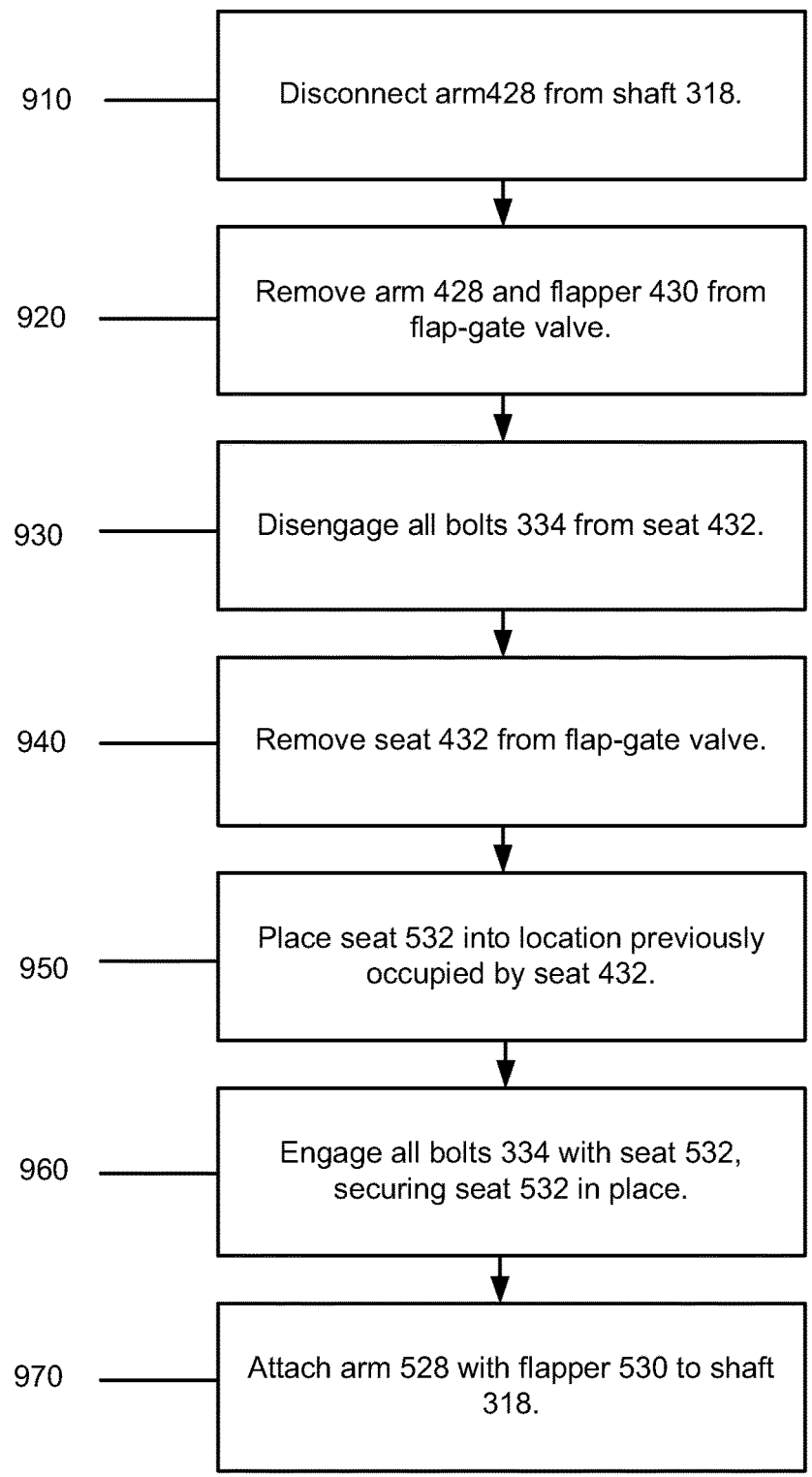
FIG. 18 is a flow chart of steps involved in retrofitting an existing flap-gate valve with components adapted to work in conjunction with a replaceable wear surface, in accordance with the present invention. The steps of the method relate to flap-gate valve and components disclosed in FIGS. 8 through 14.

FIG. 18 is a flow chart of steps involved in retrofitting an existing flap-gate valve with components adapted to work in conjunction with a replaceable wear surface, in accordance with the present invention. The steps of the method relate to flap-gate valve and components disclosed in FIGS. 8 through 14. Step 910 is to disconnect arm 428 from shaft 318. Performing this step also disconnects flapper 330, since flapper 330 is connected to arm 328. Step 920 is to remove arm 428 and flapper 430 from the flap-gate valve. Step 930 is to disengage all bolts 334 from seat 432. Step 940 is to remove seat 432 from the flap-gate valve. Next, step 950 is to place seat 532 into the location previously occupied by seat 432. Next, step 960 is to engage all bolts 334 with seat 432, thereby securing it in place in the flap-gate valve. Finally, step 970 is to attach arm 528 with flapper 530 to shaft 318, such that the flapper 530 is aligned with wear surface 552, such that they form a seal when flapper 530 engages with wear surface 552. In other embodiments, the order of the steps differ, such that the arm 428 and seat 432 are removed in the opposite order and/or the arm 528 and seat 532 are installed in the opposite order. In some embodiments, face 550 is already attached to seat 532 when seat 532 is secured into place, and in other embodiments, face 550 is attached after seat 532 is secured into place. In still further embodiments, the existing arm and/or flapper need not be replaced because they are compatible with seat 532, face 550, and wear surface 552.

The above-described embodiments are intended to illustrate the principles of the invention, but not to limit its scope. Other embodiments and variations will be apparent to those skilled in the art and may be made without departing from the spirit and scope of the invention.

The invention claimed is:

1. A method of replacing at least one component of a conventional flap-gate valve with at least one component adapted to work in conjunction with a replaceable face, the replaceable face comprising:
   a flat plate having at least one slot or bore therethrough, the at least one slot or bore having at least one bolt therethrough, for attaching the face to the bottom panel of a seat;
   a face frame with a wear surface bordering said frame, the frame and the wear surface surrounding an opening in the flat plate, the wear surface comprising air-tight sealing material or abrasion-resistant material;
   the method comprising the steps of:
      disengaging any screws or bolts from an existing seat in the flap-gate valve;
      removing the existing seat from the conventional flap-gate valve;
      installing a replacement seat comprising four side panels joined together, forming a substantially rectangular wall having an upper edge and a lower edge, and a bottom panel attached to the lower edge of the wall, the bottom panel comprising:
         a frame forming an opening; and
         at least one bore adapted to accommodate a bolt;
      bolting said face to the bottom panel of said replacement seat;
      disconnecting and removing an existing arm and flapper from a shaft in the flap-gate valve; and
      attaching to the shaft in the flap-gate valve a replacement arm and flapper, the arm being adapted to move the flapper into and out of sealing engagement with the wear surface on the replacement face.

2. A method for replacing a wear surface in a flap-gate valve, the flap-gate valve comprising:
   a seat comprising four side panels joined together, forming a substantially rectangular wall having an upper edge and a lower edge, and a bottom panel attached to the lower edge of the wall,
      the bottom panel comprising:
         a frame forming an opening; and
         at least one bore adapted to accommodate a bolt;
      wherein the surface of said seat does not comprise air-tight sealing material or abrasion-resistant material;
   a replaceable face comprising:
      a first flat plate having at least one slot or bore therethrough, the at least one slot or bore having at least one bolt therethrough, the at least one bolt attaching the replaceable face to the bottom panel of the seat;
   a piston-controlled arm; and
   a flapper movably connected to said piston-controlled arm, said flapper comprising a flapper plate,
   the steps of the method comprising:
      (a) removing the replaceable face from the bottom panel of the valve seat; and
      (b) attaching a replacement replaceable face to the bottom panel of the seat, the replacement replaceable face comprising:
         a second flat plate having at least one slot or bore therethrough, the at least one slot or bore being adapted to attach the replacement replaceable face to the bottom panel of the seat; and
         a face frame with a wear surface bordering said frame, the frame and the wear surface surrounding an opening in the second flat plate, the wear surface comprising air-tight sealing material or abrasion-resistant material, the wear surface being adapted to form a sealing engagement with the flapper when the flapper is moved into contact with the wear surface by the piston-controlled arm.

3. The method of claim 2 for replacing a wear surface in a flap-gate valve, wherein:
   step (a) further comprises:
      loosening the at least one bolt attaching the replaceable face to the bottom panel of the seat; and
      sliding the replaceable face out of engagement with the bottom panel of the seat; and
   step (b) further comprises:
      sliding a replacement replaceable face having a replacement wear surface into engagement with the bottom panel of the seat; and
      tightening the at least one bolt, thereby attaching the replacement replaceable face to the bottom panel of the seat.

4. The method of claim 2 for replacing a wear surface in a flap-gate valve, wherein:
   step (a) further comprises:
      removing the at least one bolt attaching the replaceable face to the bottom panel of the seat; and
      moving the replaceable face out of engagement with the bottom panel of the seat; and
   step (b) further comprises:
      moving a replacement replaceable face having a replacement wear surface into engagement with the bottom panel of the seat; and
      inserting and tightening the at least one bolt, thereby attaching the replacement replaceable face to the bottom panel of the seat.

5. A flap-gate valve with a replaceable wear surface, the flap-gate valve comprising:
   a seat comprising four side panels joined together, the side panels forming a substantially rectangular wall having an upper edge and a lower edge, and a bottom panel attached to the lower edge of the wall, the bottom panel comprising:
      a panel frame forming an opening; and
      at least one bore adapted to accommodate a bolt;
   wherein the surface of said seat does not comprise air-tight sealing material or abrasion-resistant material;
   a replaceable face comprising:
      a flat plate having at least one slot or bore therethrough, the at least one slot or bore having at least one bolt therethrough, the at least one bolt attaching the face to the bottom panel of the seat;
      a face frame with a wear surface bordering said face frame, the face frame and the wear surface surrounding an opening in the flat plate, the wear surface comprising air-tight sealing material or abrasion-resistant material;
   a piston-controlled arm; and
   a flapper movably connected to said piston-controlled arm to engage or disengage from said wear surface on said replaceable face, said flapper comprising a flapper plate which is shaped to form a sealing engagement with the wear surface of the face when engaged with said wear surface by said piston-controlled arm.

6. The flap-gate valve with a replaceable wear surface of claim 5, wherein the wear surface comprises rubber.

7. The flap-gate valve with a replaceable wear surface of claim 5, wherein the wear surface comprises a material selected from the group consisting of ceramic, tungsten carbide, and a combination of ceramic and tungsten carbide.

8. The flap-gate valve with a replaceable wear surface of claim 5, wherein the flat plate of the replaceable face comprises at least two indented sections forming slots, each slot being adapted to allow a bolt to pass through the flat plate, whereby the face is attached to the bottom panel of the seat.

9. The flap-gate valve with a replaceable wear surface of claim 5, wherein the flapper plate is circular in shape.

10. The flap-gate valve with a replaceable wear surface of claim 5, wherein the cross-sectional area of the rectangular wall in the seat tapers down in size from the upper edge of the wall to the lower edge of the wall.

11. The flap-gate valve with a replaceable wear surface of claim 5, wherein the bottom panel comprises at least two bores, each adapted to accommodate a bolt for attaching the face to the bottom panel of the seat.

12. The flap-gate valve with a replaceable wear surface of claim 5, wherein the bottom panel further comprises:
two more bores, each having a bolt therethrough; and
on each said bolt, a metal tab adapted to hold a portion of the face against the bottom panel.

13. A kit for retrofitting a flap-gate valve, the kit comprising:
a seat comprising:
four side panels joined together, forming a substantially rectangular wall having an upper edge and a lower edge, and
a bottom panel attached to the lower edge of the wall, the bottom panel comprising:
a bottom panel frame forming an opening, and
at least one bore adapted to accommodate a bolt;
wherein the surface of said seat does not comprise air-tight sealing material or abrasion-resistant material;
a replaceable face comprising:
a flat plate having at least one slot or bore therethrough, the at least one slot or bore having at least one bolt therethrough, the at least one bolt attaching the face to the bottom panel of the seat; and
a face frame with a wear surface bordering the frame, the face frame and the wear surface surrounding an opening in the flat plate, the wear surface comprising air-tight sealing material or abrasion-resistant material;
a piston-controlled arm; and
a flapper movably connected to the piston-controlled arm to engage or disengage from the wear surface on the replaceable face, the flapper comprising a flapper plate shaped to form a sealing engagement with the wear surface of the frame face when engaged with the wear surface by the piston-controlled arm,
wherein a user removes an existing arm, an existing flapper, and an existing seat from a flap-gate valve and installs the seat, the face, the arm, and the flapper.

14. The kit of claim 13, wherein the wear surface comprises material selected from the group consisting of rubber, ceramic, tungsten carbide, and a combination of ceramic and tungsten carbide.

15. The kit of claim 13, wherein the flat plate of the replaceable face comprises at least two indented sections forming slots, each slot being adapted to allow a bolt to pass through the flat plate, whereby the replaceable face is attached to the bottom panel of the seat.

16. The kit of claim 13, wherein the flapper plate is circular in shape.

17. The kit of claim 13, wherein the cross-sectional area of the rectangular wall in the seat tapers down in size from the upper edge of the wall to the lower edge of the wall.

18. The kit of claim 13, wherein the bottom panel comprises at least two bores, each adapted to accommodate a bolt for attaching the replaceable face to the bottom panel of the seat.

19. The kit of claim 13, wherein the bottom panel of the seat further comprises:
two more bores, each having a bolt therethrough; and
on each said bolt, a metal tab adapted to hold a portion of the face against the bottom panel.

\* \* \* \* \*